United States Patent
Luo et al.

(10) Patent No.: US 12,452,943 B2
(45) Date of Patent: Oct. 21, 2025

(54) LINK CONTROL METHOD AND APPARATUS, DEVICE, AND STORAGE MEDIUM

(71) Applicant: GUANGDONG OPPO MOBILE TELECOMMUNICATIONS CORP., LTD., Dongguan (CN)

(72) Inventors: Chaoming Luo, Dongguan (CN); Liuming Lu, Dongguan (CN); Pei Zhou, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 19/217,872

(22) Filed: May 23, 2025

(65) Prior Publication Data

US 2025/0287448 A1 Sep. 11, 2025

Related U.S. Application Data

(63) Continuation of application No. PCT/CN2022/140343, filed on Dec. 20, 2022.

(51) Int. Cl.
*H04W 76/15* (2018.01)
*H04W 84/12* (2009.01)

(52) U.S. Cl.
CPC ............ *H04W 76/15* (2018.02); *H04W 84/12* (2013.01)

(58) Field of Classification Search
CPC ................................ H04W 76/15; H04W 84/12
See application file for complete search history.

(56) References Cited

U.S. PATENT DOCUMENTS

| 2021/0014776 A1* | 1/2021 | Patil | H04W 74/0808 |
| 2021/0282007 A1* | 9/2021 | Ho | H04W 12/041 |
| 2021/0400662 A1* | 12/2021 | Huang | H04B 1/48 |
| 2022/0124855 A1* | 4/2022 | Hu | H04W 76/34 |

OTHER PUBLICATIONS

International Search Report in the international application No. PCT/CN2022/140343, mailed on Aug. 31, 2023. 5 pages with English translation.
Written Opinion of the International Search Authority in the international application No. PCT/CN2022/140343, mailed on Aug. 31, 2023. 8 pages with English translation.

(Continued)

*Primary Examiner* — Mohammad S Anwar
(74) *Attorney, Agent, or Firm* — BAYES PLLC

(57) ABSTRACT

A link control method and an AP MLD are provided. The method includes: when an AP MLD receives a multi-link reconfiguration request frame from a first Non-AP STA affiliated with a first Non-AP MLD through a first AP affiliated with the AP MLD and a first address of at least one second Non-AP STA among Non-AP STAs affiliated with the first Non-AP MLD satisfies a first condition and/or a second condition, the AP MLD transmits a first status code. The first condition is related to at least one third Non-AP STA among Non-AP STAs affiliated with a second Non-AP MLD associated with the AP MLD. The second condition is related to fourth Non-AP STA(s) associated with a second AP affiliated with the AP MLD.

20 Claims, 10 Drawing Sheets

If an AP MLD receives a first frame transmitted by a first Non-AP STA affiliated with a first Non-AP MLD through a first AP affiliated with the AP MLD, and a first address of at least one second Non-AP STA among Non-AP STAs affiliated with the first Non-AP MLD satisfies a first condition and/or a second condition, the AP MLD transmits a first status code, herein, the first frame is used for requesting an association and/or a reassociation and/or a multi-link reconfiguration, the first condition is related to at least one third Non-AP STA among Non-AP STAs affiliated with a second Non-AP MLD which is associated with the AP MLD, the second condition is related to fourth Non-AP STA(s) which are associated with a second AP affiliated with the AP MLD, and the first status code is used for rejecting an association request and/or a reassociation request and/or a multi-link reconfiguration request

501

(56) References Cited

OTHER PUBLICATIONS

IEEE Standard for Information Technology—Telecommunications and Information Exchange between Systems Local and Metropolitan Area Networks—Specific Requirements, "Part 11: Wireless LAN Medium Access Control (MAC) and Physical Layer (PHY) Specifications", IEEE Computer Society Developed by the LAN/MAN Standards Committee, IEEE Std 802.11™-2020 (Revision of IEEE Std 802.11-2016), section 11.3.5.3 and 11.3.5.5.

IEEE P802.11be™/D2.2, Oct. 2022, Draft Standard for Information technology—Telecommunications and information exchange between systems Local and metropolitan area networks—Specific requirements, Part 11: Wireless LAN Medium Access Control (MAC) and Physical Layer (PHY) Specifications Amendment 8: Enhancements for extremely high throughput (EHT), Prepared by the 802.11 Working Group of the LAN/MAN Standards Committee of the IEEE Computer Society, section 11.3.6.3 and 11.3.6.5.

IEEE P802.11 Wireless LANs, 11-22-1236-06-00be, Po-Kai Huang, "11be D2.0 CR for 4.3 and 4.5 Part I", Date: Aug. 1, 2022, pp. 1-36.

IEEE P802.11 Wireless LANs, doc.: IEEE 802.11-20/1650r1, Po-Kai Huang, Intel Corporation, "Proposed TBD fix for MLD Association—SA Query", Date: Oct. 20, 2020, pp. 1-9.

IEEE P802.11 Wireless LANs, doc.: IEEE 802.11-07/2461r10, Joe Epstein, Kapil Sood, "SA Teardown Protection", Date: Jan. 14, 2008, pp. 1-12.

Doc.: IEEE 802.11-07/2441r3, Joe Epstein, "SA Teardown Protection for 802.11w", Date: Nov. 5, 2007, pp. 1-21.

IEEE P802.11 Wireless LANs, doc.: IEEE 802.11-22/1709r4, Binita Gupta, Meta Platforms, Inc., "LB 266—CR for ML Reconfiguration Add/Delete Link procedure", Date: Sep. 20, 2022, pp. 1-21.

* cited by examiner

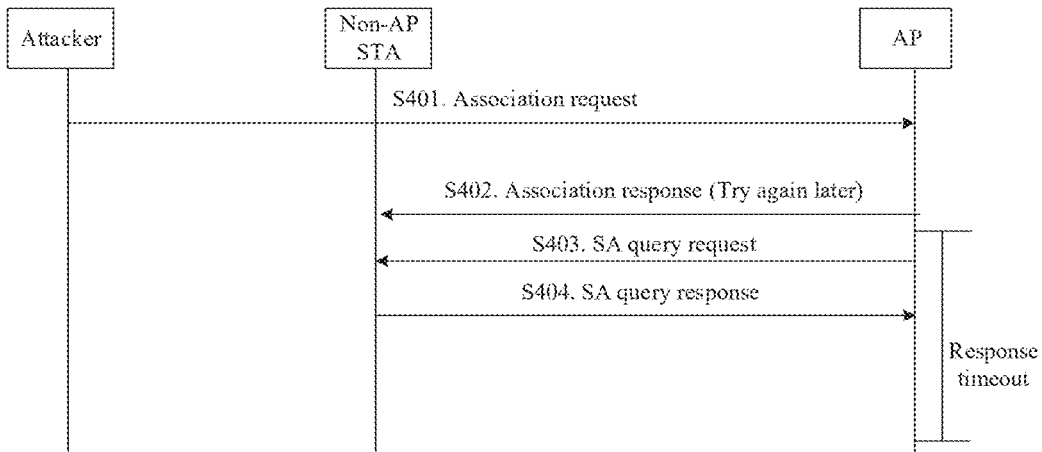
FIG. 4
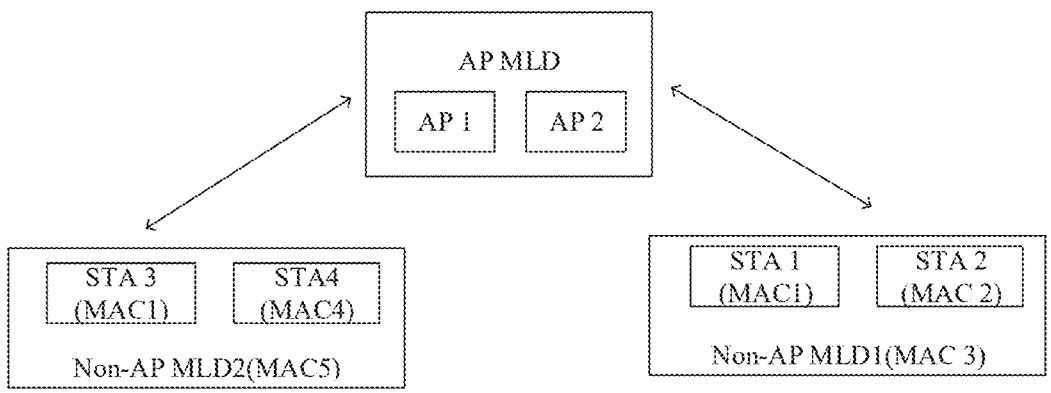
FIG. 5
FIG. 6

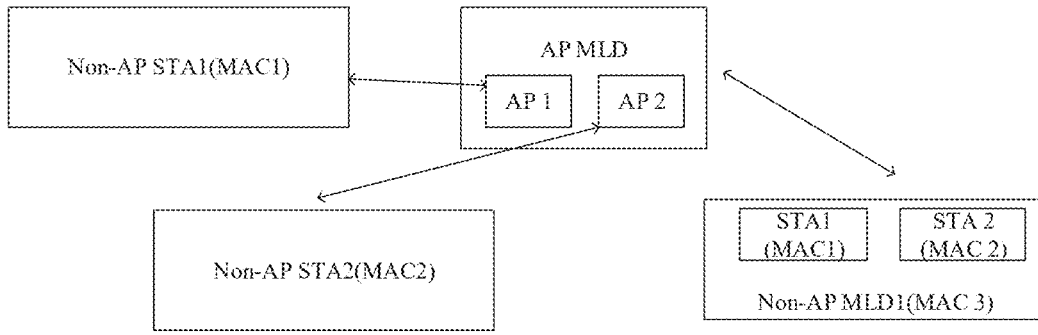

FIG. 9

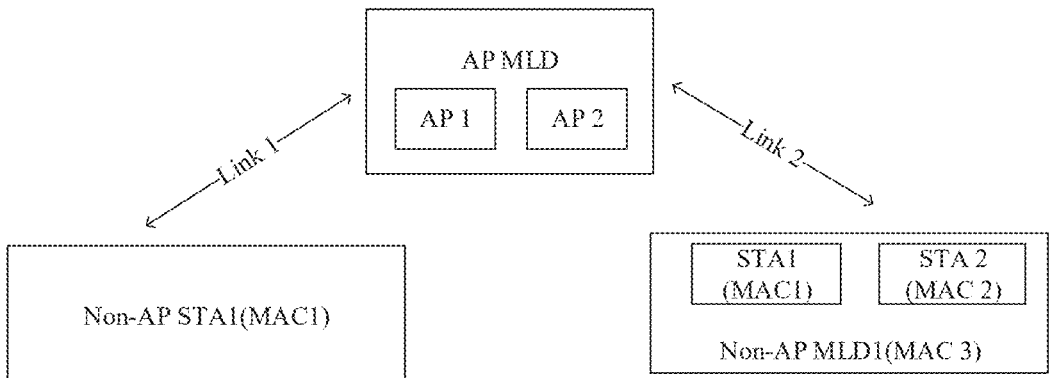

FIG. 10

| If the AP MLD receives a second frame transmitted by a fifth Non-AP STA through a third AP affiliated with the AP MLD, and a fourth address of the fifth Non-AP STA satisfies a third condition, the AP MLD transmits a second status code, herein, the second frame is used for requesting an association and/or a reassociation, the third condition is related to at least one sixth Non-AP STA affiliated with a third Non-AP MLD which has been associated with the AP MLD, and the second status code is used for rejecting an association request and/or a reassociation request from the fifth Non-AP STA | 1101 |

FIG. 11

LINK CONTROL METHOD AND APPARATUS, DEVICE, AND STORAGE MEDIUM

CROSS-REFERENCE TO RELATED APPLICATION(S)

This application is a continuation of International Application No. PCT/CN2022/140343 filed on Dec. 20, 2022, the entire contents of which are hereby incorporated by reference in its entirety.

RELATED ART

At present, the Wireless Local Area Network (WLAN) industry is one of the fastest developing industries in the entire data communication field. As a supplement and extension of traditional wired local area networks, WLAN solutions have gained popularity among home network users, small and medium-sized office users, enterprise users and telecom operators due to their advantages such as flexibility, mobility, expandability and lower investment cost, and thus have been quickly applied.

An Access Point Multi-Link Device (AP MLD) can form a WLAN based on transmitted signals. For an AP MLD, there are two types of stations with which associations can be established: a Non-Access Point Station (Non-AP STA) and a Non-Access Point Multi-Link Device (Non-AP MLD). In related arts, an attacker may carry a Media Access Control (MAC) address that the AP MLD considers legit, to establish an association with the AP MLD. This requires the AP MLD to be able to accurately determine whether a STA requesting to establish an association with the AP MLD is a legit STA or an attacker.

SUMMARY

Embodiments of the disclosure relate to the field of mobile communication technologies, and provide a link control method and an AP MLD.

In a first aspect, an embodiment of the disclosure provides a link control method including the following operation.

When an AP MLD receives a multi-link reconfiguration request frame from a first Non-AP STA affiliated with a first Non-AP MLD through a first AP affiliated with the AP MLD, and a first address of at least one second Non-AP STA among Non-AP STAs affiliated with the first Non-AP MLD satisfies a first condition and/or a second condition, the AP MLD transmits a first status code.

The first condition is related to at least one third Non-AP STA among Non-AP STAs affiliated with a second Non-AP MLD which is associated with the AP MLD. The second condition is related to fourth Non-AP STA(s) which are associated with a second AP affiliated with the AP MLD.

In a second aspect, an embodiment of the disclosure provides an AP MLD including a transceiver, a processor, and a memory.

The memory is configured to store a computer program that, when executed by the processor, causes the AP MLD to transmit a first status code through the transceiver when the AP MLD receives a multi-link reconfiguration request frame from a first Non-AP STA affiliated with a first Non-AP MLD through a first AP affiliated with the AP MLD, and a first address of at least one second Non-AP STA among Non-AP STAs affiliated with the first Non-AP MLD satisfies a first condition and/or a second condition.

The first condition is related to at least one third Non-AP STA among Non-AP STAs affiliated with a second Non-AP MLD which is associated with the AP MLD. The second condition is related to fourth Non-AP STA(s) which are associated with a second AP affiliated with the AP MLD.

BRIEF DESCRIPTION OF THE DRAWINGS

The accompanying drawings, which are illustrated herein, provide a further understanding of the disclosure and constitute a part of this disclosure. The exemplary embodiments of the disclosure and their description are used to explain the disclosure and not to unduly limit the disclosure. In the drawings:

FIG. 4 is an optional flowchart of a link control method according to an embodiment of the disclosure.

FIG. 5 is an optional flowchart of a link control method according to an embodiment of the disclosure.

FIG. 6 is an optional diagram of an application scenario according to an embodiment of the disclosure.

FIG. 9 is an optional diagram of an application scenario according to an embodiment of the disclosure.

FIG. 10 is an optional diagram of an application scenario according to an embodiment of the disclosure.

FIG. 11 is an optional flowchart of a link control method according to an embodiment of the disclosure.

DETAILED DESCRIPTION

The technical solutions in the embodiments of the disclosure would be described below in conjunction with the accompanying drawings in the embodiments of the disclosure. It is apparent that the described embodiments are a part of the embodiments of the disclosure, rather than all of the embodiments. Based on the embodiments of the disclosure, all other embodiments obtained by those of ordinary skill in the art without creative effort fall within the scope of protection of the disclosure.

The technical solutions in embodiments of the disclosure can be applied to various communication systems, such as a Wireless Local Area Network (WLAN) system, a Wireless Fidelity (WiFi) system, other communication systems and the like. The frequency bands that the WLAN can support may include, but are not limited to, low frequency bands (2.4 GHz, 5 GHZ, 6 GHZ), high frequency bands (45 GHz, 60 GHz).

Figure 1:
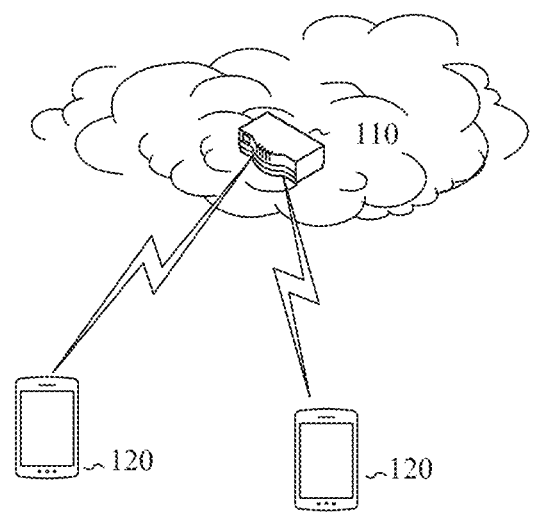
FIG. 1 is an optional diagram of an application scenario according to an embodiment of the disclosure.

FIG. 1 is an example of architecture of a communication system to which an embodiment of the disclosure applies.

As illustrated in FIG. 1, the communication system 100 may include an AP 110, and STAs 120 accessing a network through the AP 110. In some scenarios, the AP 110 may be referred to as an AP STA, i.e., the AP 110 is also a type of STA in a sense. In some scenarios, the STA 120 may be referred to as a Non-AP STA. In some scenarios, the STA 120 may include an AP STA and a Non-AP STA. Communications in the communication system 100 may include: a communication between the AP 110 and the STA 120, or a communication between the STA 120 and the STA 120, or a communication between the STA 120 and a peer STA, where the peer STA may refer to a peer device communicating with the STA 120. For example, the peer STA may be an AP or a Non-AP STA.

The AP 110 may be used as a bridge connecting a wired network and a wireless network, and its main function is to connect various wireless network clients together, and then connect the wireless network to Ethernet. The AP 110 may be a terminal device (e.g., a mobile phone) or network device (e.g., router) with a WiFi chip.

It should be noted that the role of the STA 120 in the communication system is not absolute. That is to say, the role of the STA 120 in the communication system may be switched between the AP and the STA. For example, in some scenarios, when the mobile phone is connected to the route, the mobile phone is an STA; and when the mobile phone is a hotspot for other mobile phones, the mobile phone acts as an AP.

In some embodiments, the AP 110 and the STA 120 may be devices applied in the Vehicle to Everything (V2X), Internet of Things (IoT) nodes, sensors and the like in the IoT, smart cameras, smart remote controllers, smart water meters, smart electric meters and the like in a smart home, and sensors and the like in a smart city.

In some embodiments, the AP 110 may be a device supporting the 802.11be standard. The AP may be a device supporting various current and future 802.11 family WLAN standards such as 802.11ax, 802.11ac, 802.11n, 802.11g, 802.11b, and 802.11a. In some embodiments, the STA 120 may support the 802.11be format. The STA may also support various current and future 802.11 family WLAN standards such as 802.11ax, 802.11ac, 802.11n, 802.11g, 802.11b and 802.11a.

In some embodiments, the AP 110 and/or the STA 120 may be arranged on land including indoor or outdoor areas, handheld, wearable, or on-board; or may be arranged on the water (such as on a ship); or may be arranged in the air (such as on an airplane, a balloon, or a satellite).

In some embodiments, the STA 120 may be a device supporting WLAN/WiFi technologies, such as a mobile phone, a tablet computer (or Pad), a computer with wireless transceiver function, a Virtual Reality (VR) device, an Augmented Reality (AR) device, a wireless device in industrial control, a set-top box, a wireless device in self-driving, an on-board communication device, a wireless device in remote medical, a wireless device in a smart grid, a wireless device in transportation security, a wireless device in a smart city, a wireless device in a smart home, an on-board communication device, or a wireless communication chip/Application Specific Integrated Circuit (ASIC)/System on Chip (SoC).

Exemplarily, the STA 120 may also be a wearable device. The wearable device may also be referred to as a wearable smart device, which is a general term of wearable devices developed by applying a wearable technology to intelligently design daily wearable objects, such as glasses, gloves, watches, clothing, shoes, or the like. The wearable device is directly worn on the body, or is a portable device integrated into a user's clothing or accessory. The wearable device is not only a hardware device, but also achieves powerful functions through software support, data interaction and cloud interaction. A generalized wearable smart device includes those with comprehensive functionality and large sizes that may not rely on smart phones to implement full or part of the functions, such as smart watches, or smart glasses; as well as those only focusing on specific application functions, that need to be used in cooperation with other devices such as a smart phone, such as various kinds of smart bracelets and smart jewelry for monitoring physical signs.

It should be understood that FIG. 1 is merely an example of the disclosure, which should not be understood as a limitation to the disclosure. For example, FIG. 1 exemplarily illustrates only one AP and two STAs. In some embodiments, the communication system 100 may include multiple APs as well as other numbers of STAs, which would not be limited in embodiments of the present disclosure.

Figure 2A:
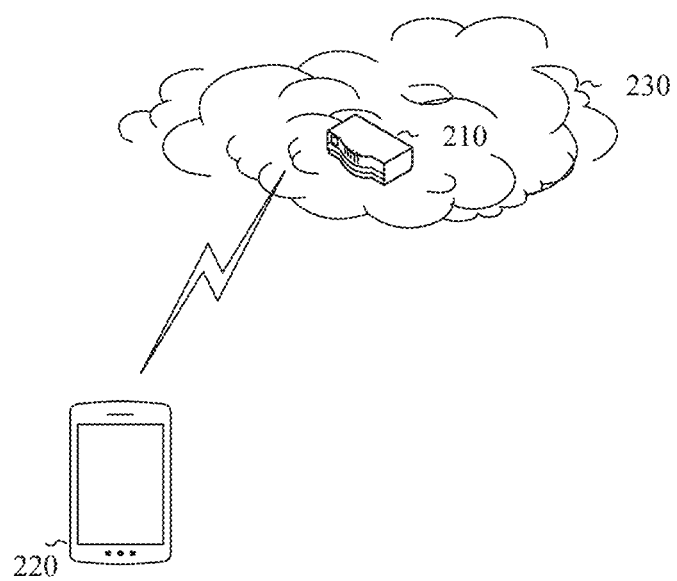
FIG. 2A is an optional diagram of an application scenario according to an embodiment of the disclosure.

FIG. 2A is a schematic diagram of an application scenario according to an embodiment of the disclosure.

As illustrated in FIG. 2A, the communication system 200 may include an AP MLD 210, a Non-AP MLD 220. The AP MLD 210 is an electronic device capable of forming a WLAN 230 based on a transmitted signal, such as a router, and a mobile phone having a hotspot function. The Non-AP MLD 220 is an electronic device connected to the WLAN 230 formed by the AP MLD 210, such as a mobile phone, a smart washing machine, an air conditioner, and an electronic lock. The Non-AP MLD 220 communicates with the AP MLD 210 through the WLAN 230. The AP MLD 210 may be a soft AP MLD, a mobile AP MLD, or the like.

Figure 2B:
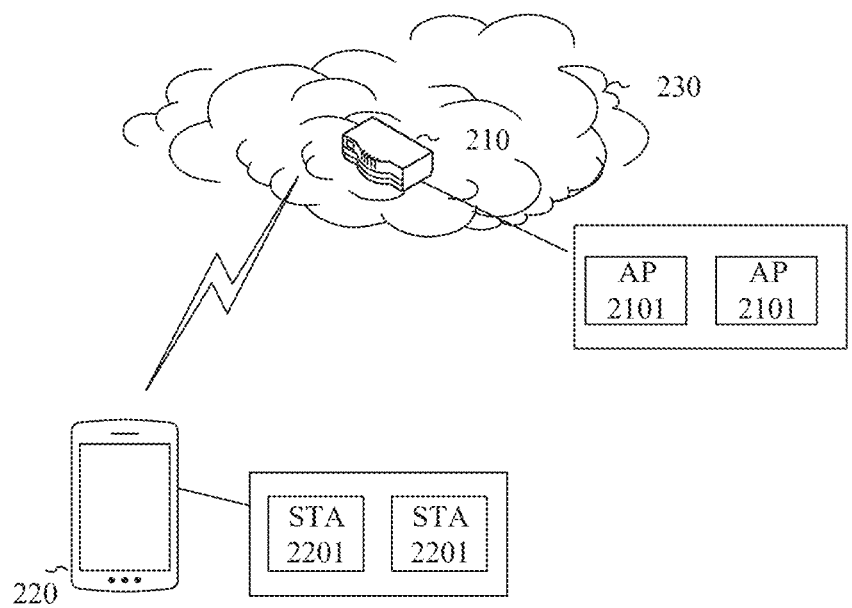
FIG. 2B is an optional diagram of an application scenario according to an embodiment of the disclosure.

As illustrated in FIG. 2B, in the communication system of FIG. 2A, the AP MLD 210 is affiliated with at least two APs 2101, and the Non-AP MLD 220 is affiliated with at least two STAs 2201. Each AP is connected to a different STA in the Non-AP MLD 220 via a different link. An AP affiliated with AP MLD may also be referred to as an affiliated AP of the AP MLD. A STA affiliated with Non-AP MLD may also be referred to as a Non-AP STA affiliated with the Non-AP MLD or an affiliated STA of the Non-AP MLD.

In embodiments of the disclosure, the AP MLD 210 and the Non-AP MLD 220 may be terminal devices. The terminal device may refer to an access terminal, a User Equipment (UE), a user unit, a user station, a mobile station, a remote station, a remote terminal, a mobile device, a user terminal, a terminal, a wireless communication device, a user agent or a user apparatus. The access terminal may be a cellular telephone, a cordless phone, a Session Initiation Protocol (SIP) phone, a Wireless Local Loop (WLL) station, a Personal Digital Assistant (PDA), a handheld device with a wireless communication function, a computing device or other processing devices connected to a wireless modem, a vehicle-mounted device, a wearable device, a terminal device in the 5G network, or a terminal device in a future-evolved Public Land Mobile Network (PLMN) network, or the like.

The communication system 200 illustrated in FIG. 2A may further include a network device, and the network device may be an access network device that communicates with the terminal device. The access network device may provide communication coverage for a particular geographic area and may communicate with terminal devices located within the coverage area.

FIG. 2A exemplarily illustrates one AP MLD and one Non-AP MLD. Optionally, the communication system 200 may include multiple Non-AP MLDs connected to the WLAN 230, which would not be limited in embodiments of the present disclosure.

It should be noted that FIGS. 1, 2A and 2B only illustrates, by way of an example, the system to which the present disclosure is applied. Of course, the methods illustrated in the embodiments of the present disclosure may also be applied to other systems. In addition, the terms "system" and "network" in the present disclosure may usually be used interchangeably. In the disclosure, the term "and/or" refers to only an association relationship for describing associated objects and represents that three relationships may exist. For example, A and/or B may represent three cases: i.e., only A exists, both A and B exist, and only B exists. Furthermore, character "/" in the disclosure usually represents that previous and next associated objects form an "or" relationship. It should also be understood that the term "indication/indicate/indicating" mentioned in the embodiments of the disclosure may be a direct indication, or may be an indirect indication, or may represent existence of an association relationship. For example, A indicates B, which may represent that A directly indicates B, for example, B may be obtained by A; or may represent that A indirectly indicates B, for example, A indicates C, and B may be obtained by C; or may represent that an association relationship exists between A and B. It should also be understood that the term "corresponding/correspondence/correspond" mentioned in the embodiments of the present disclosure may indicate that there are direct or indirect correspondences between two objects, or may indicate that there is an association relationship between the two objects, or may have an indicating and being indicated relationship, a configuring and being configured relationship, or the like. It should also be understood that the terms "predefined/predefinition" or "predefined rules" mentioned in the embodiments of the present disclosure may be implemented by pre-storing corresponding codes or tables or by other means that may be used to indicate relevant information in devices (e.g., including terminal devices and network devices), specific implementations of which are not limited herein. For example, the "predefined" may refer to what is defined in protocol. It should also be understood that in the embodiments of the present disclosure, the "protocol" may refer to standard protocols in the communication field, and may include, for example, an IEEE 802.11 protocol, an LTE protocol, an NR protocol and related protocols applied in future communication systems, which are not limited in the present disclosure.

For convenience of understanding of the technical solutions of the embodiments of the disclosure, related technologies in the embodiments of the disclosure are described. The following related technologies may be used as alternative solutions and may be combined with the technical solutions of the embodiments of the disclosure in various ways, all of which belong to the scope of protection of the embodiments of the disclosure.

Security Association Teardown Protection

When a legit Non-AP STA that is associated is expected to perform a reassociation, the Non-AP STA transmits an association request frame and/or a reassociation request frame to an AP. When the AP detects that there is a Security Association (SA) with the Non-AP STA currently, the AP will continuously transmit a SA query request to the Non-AP STA. The Non-AP STA will ignore the SA query request until an expiration results in a termination of the security association, and then transmits the association request frame and/or the reassociation request frame to the AP again.

Figure 3:
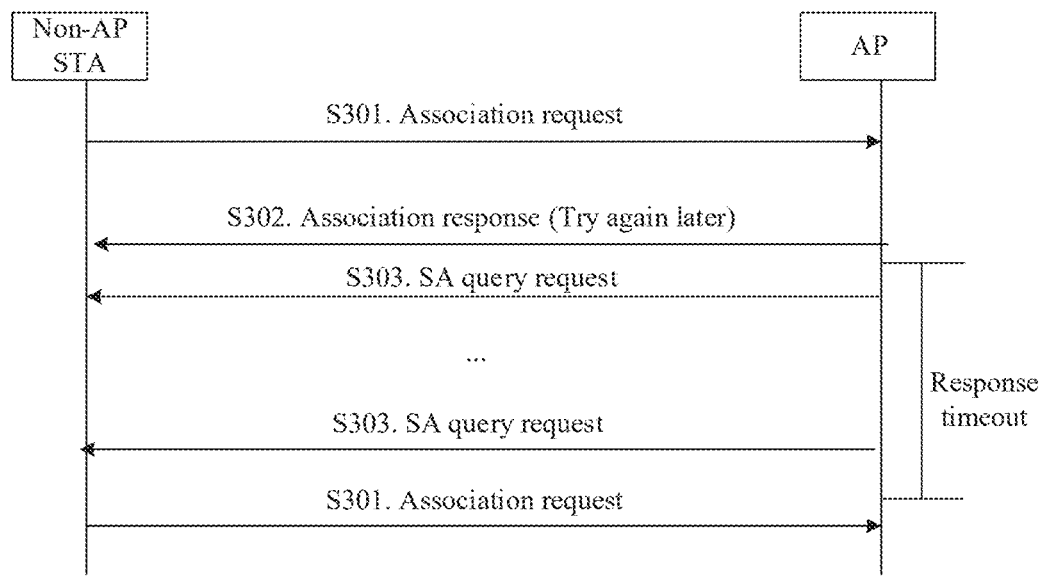
FIG. 3 is an optional flowchart of a link control method according to an embodiment of the disclosure.

As illustrated in FIG. 3, the process includes the following operations S301 to S303.

At the operation S301, the Non-AP STA transmits an association request to the AP.

At the operation S302, the AP transmits an association response to the Non-AP STA.

The Association Response is used to indicate rejection of the association request. The rejection can be understood as trying again later.

At the operation S303, the AP continuously transmits the SA query request before a timer expires.

Herein, the timer expiration may be understood as a response timeout.

After the timer expires, the Non-AP STA performs the operation S301 again to transmit the association request to the AP.

When an attacker imitating a MAC address of a legit Non-AP STA transmits an association request frame and/or a reassociation request frame to the AP, the AP detects that there is a security association with the legit Non-AP STA currently, and transmits an association response frame and/or a reassociation response frame indicating rejection to the legit Non-AP STA and instructs the Non-AP STA to try again later. Then, the AP transmits an SA query request to the legit Non-AP STA. Because the legit Non-AP STA is not expected to perform the reassociation, the legit Non-AP STA will transmit a SA query response frame to the AP, thus the SA between the legit Non-AP STA and the AP remains unaffected.

As illustrated in FIG. 4, the process includes the following operations S401 to S404.

At the operation S401, an attacker transmits an association request to an AP.

At the operation S402, the AP transmits an association response to the Non-AP STA.

The Association Response is used to indicate rejection of the association request. The rejection can be understood as trying again later.

At the operation S403, the AP transmits a SA query request to the Non-AP STA before a timer expires.

At the operation S404, the Non-AP STA transmits an SA query response to the AP.

The SA query response may be understood as a response to the SA query request.

SA Query Procedure

When an associated legit Non-AP STA receives an unprotected disassociation frame or disauthentication frame, the associated legit Non-AP STA may verify whether the disassociation frame or the disauthentication frame is from the legit AP by executing a SA query procedure with a legit AP associated with it. When the AP receives a reassociation request frame, the AP may verify whether the reassociation request frame is from the legit Non-AP STA by executing a SA query procedure with an associated legit Non-AP STA.

The flow of the SA query procedure includes the following operation.

If a variable dot11RSNAProtectedManagementFramesActivated, which indicates whether a management frame protection function in the SA is active, is true, i.e., indicating that the management frame protection function in the SA is active, the STA or MLD shall support the SA query procedure.

In order to transmit an SA query request or an SA query response frame to a peer STA or a peer MLD, a Station Management Entity (SME) shall issue a MAC Sublayer Management Entity (MLME)-SA-Query.request or MLME-SA-Query.response primitive. Reception of the SA query request or the SA query response frame is signaled to the SME with an MLME-SA-Query.indication or MLME-SA-Query.confirm primitive, respectively.

A STA or a MLD that supports the SA query procedure and receives an SA query request frame shall respond with the SA query response frame if none of the following are true. 1. The STA or the Non-AP MLD is not currently associated with the STA or the AP MLD that sent the SA query request frame. 2. The STA has sent the (re) association request frame within the duration indicated by a variable dot11AssociationResponse TimeOut, but has not received a corresponding (re) association response frame. 3. A variable dot11RSNAOperatingChannel ValidationActivated indicating whether an operating channel validation function is activated is true, i.e., indicating that the operating channel validation function is activated, and the sending STA had indicated Operating Channel Validation Capable (OCVC) capability in its association, and either Operating Channel Information (OCI) element is not present in the SA query request or the OCI indicated does not match the current channel information.

A STA that responds with an SA query response frame to a STA that indicated OCVC capability shall include an OCI element in the SA query response frame if dot11RSNAOperatingChannel ValidationActivated is true.

When a Non-AP or Non-PCP (Personal Basic Service Set (PBSS) Control Point, PCP) STA receives the SA query response frame from a STA that indicated OCVC capability, it shall ensure that OCI element is present in the SA response and the channel information in the OCI element matches current operating channel parameters. Otherwise, the receiving STA shall deem the response as invalid and discard it.

If a Non-AP or Non-PCP STA initiated an SA query procedure following a channel switch and does not receive the SA query response frame from a STA that indicated OCVC capability within dot11AssociationResponseTimeOut time units from the beginning of the SA query procedure, the Non-AP or the Non-PCP STA shall deauthenticate from the Basic Service Set (BSS).

A Non-AP or a Non-PCP STA does not response if it is trying to reassociate with an AP or a PCP that sent the SA query request (frame) or to another AP or PCP that sent the SA query request (frame). There is no such restriction for the AP or the PCP.

If a Non-AP or Non-PCP STA that has a SA with the AP or PCP for an association that negotiated management frame protection receives an addressed unprotected deauthentication or deassociation frame with reason code INVALID_CLASS2 frame or INVALID_CLASS3_frame from the AP or PCP, the Non-AP or Non-PCP STA may use this as an indication that there might be a mismatch in the association state between itself and the AP or PCP. In such a case, the SME of the Non-AP or Non-PCP STA may initiate the SA query procedure with the AP or PCP to verify the validity of the SA by issuing one MLME-SA-QUERY.request primitive every dot11AssociationSAQueryRetryTimeout time units until a matching MLME-SA-QUERY.confirm primitive is received or dot11AssociationSAQueryRetryTimeout time units from the beginning of the SA query procedure has passed. If the AP or PCP responds to the SA query request with a valid SA query response, the Non-AP STA should continue to use the SA. If no valid SA query response is received, the SME of the Non-AP and Non-PCP STA may delete the SA (and temporal keys) held for communication with the STA by issuing the MLME-DELETEKEYS.request primitive, and the Non-AP and Non-PCP may move into State 1, i.e., an unauthenticated unassociated state, (or State 2, for a Directional Multi-Gigabit (DMG) STA) with the AP.

If a Non-AP STA affiliated with a Non-AP MLD that has a SA with its AP MLD for an association that negotiated management frame protection receives an unprotected deauthentication or deassociation frame with reason code INVALID_CLASS2_frame or INVALID_CLASS3_frame from the AP affiliated with the AP MLD in a setup link, the Non-AP MLD may use this as an indication that there might be a mismatch in the association status between itself and the AP MLD. In such a case, the SME may initiate the SA query procedure with the AP MLD to verify the validity of the SA by issuing one MLME-SA-QUERY.request primitive every dot11AssociationSAQueryRetryTimeout time units until a matching MLME-SA-QUERY.confirm primitive is received, or dot11AssociationSAQueryMaximum Timeout time units from the beginning of the SA query procedure has passed. If the AP MLD responds to the SA query request with a valid SA query response, the Non-AP MLD should continue to use the SA. If no valid SA query response is received, the SME may delete the SA and temporal keys held for communication with the AP MLD by issuing the MLME-DELETEKEYS.request primitive and the Non-AP MLD may move into State 1, i.e., an unauthenticated unassociated state, with the AP MLD.

When a Sub 1 GHz (SIG) STA in a power save mode wakes up with an interval longer than dot11AssociationSAQueryMaximum Timeout, an existing SA has been destroyed. So, to maintain its valid SA state, the SIG STA shall wake to listen to SA request frame with the interval specified by dot11AssociationSAQueryMaximum Timeout. When dot11RSNAProtectedManagementFramesActivated is true, an SIG AP shall provide the timeout interval in an association response frame and/or a reassociation response frame with a status code 0 to the SIG STA.

Relationship Between Non-AP MLD and AP MLD

The protocol stipulates that in a multi-link operation, a security association negotiation is performed at a MLD level instead of an affiliated STA level. However, after the security association negotiation is completed and the multi-link is established, the affiliated STA shall also change to the associated state like the MLD as follows.

"STA" means that the "STA" is not affiliated with an MLD unless specified otherwise.

For a Multi-Link Operation (MLO), security associations are negotiated between peer MLDs. The use of the term "STA or MLD" refers to requirements on a STA when peer MLDs establish a security association, or requirements on an MLD when peer MLDs establish a security association. In the case where MLDs negotiate a security association, the "SME" is the entity that manages the MLD.

When a Robust Secure Network Association (RSNA) is established between peer MLD SMEs, the MAC address that appear in the frame body of authentication and association frames and within Extensible Authentication Protocol over LAN (EAPOL) key frames shall be the MLD MAC address. These frames are transmitted by a STA affiliated with the MLD.

After successful multi-link (re) setup between the Non-AP MLD and the AP MLD, the Non-AP MLD is associated with the AP MLD following the (re) association procedure between MLDs, and the Non-AP MLD and the AP MLD set up link(s) for the multi-link operation.

For each setup link, the corresponding Non-AP STA affiliated with the Non-AP MLD is in the same associated state as the Non-AP MLD and is associated with the corresponding AP affiliated with the AP MLD. For each setup link, there is no mapping between the Non-AP STA affiliated with the Non-AP MLD and the AP affiliated with the AP MLD provided to the Distribution System (DS).

Authentication and Association State

The current state existing between the transmitter and receiver STAs determines the frame types that may be exchanged between the STAs. When the current state is State 1 (i.e., unauthenticated unassociated state) or state 2 (i.e., authenticated but unassociated state), the current state existing between a pair of MLDs determines the frame types that may be exchanged through affiliated STAs between the pair of MLDs. When the current state is State 3 (i.e., authenticated and associated but not unblocked state) or State 4 (i.e., authenticated, associated and unblocked state), the current state existing between a pair of MLDs determines the frame types that may be exchanged on the setup link between the pair of MLDs. A unique state exists for each pair of transmitter and receiver STAs or each pair of MLDs.

How AP or AP MLD Processes the Association Request

For a Non-AP MLD associated with an AP MLD, if an AP affiliated with the AP MLD receives an association request frame without a basic multi-link element from a Non-AP STA affiliated with the Non-AP MLD, then the AP shall reject the association request with a status code of DENIED_ STA_affiliated_with_EXISTING_MLD_Association.

The following procedure shall be used by an AP or PCP upon receipt of an association request frame from a STA or by an AP MLD after an AP affiliated with the AP MLD receives an association request frame with the basic multi-link element from a Non-AP STA affiliated with a Non-AP MLD.

a. The MLME shall issue an MLME-ASSOCIATE.indication primitive to inform the SME of the association request. The SME shall issue an MLME-ASSOCIATE.response primitive addressed to the STA or MLD identified by a PeerSTAAddress parameter of the MLME-ASSOCIATE indication primitive. If the association is not successful, the SME shall indicate a specific reason for the failure to associate in a ResultCode parameter. Upon receipt of the MLME-ASSOCIATE.response primitive, the MLME shall transmit an associated response frame.

b. If the state for the STA is State 1 and the STA is a Non-DMG STA or the state of the Non-AP MLD is State 1, the SME shall refuse the association request by issuing an MLME-ASSOCIATE.response primitive with ResultCode NOT_AUTHENTICATED.

c. An AP with the variable dot11InterworkingServiceActivated, only indicating interworking capability with external networks, set to true only: if the MLME-ASSOCIATE.indication primitive has the EmergencyServices parameter set to true and a Robust Security Network (RSN) parameter does not include an RSNE, the SME shall not reject the association request on the basis that dot11RSNAActivated is true, thereby granting access, using unprotected frames, to the network for emergency services purpose.

d. Otherwise, in the RSNA, the SME shall check the values received in the RSN parameters to see whether the values received match the security policy. If they do not, the SME shall refuse the association by issuing an MLME-ASSOCIATE.response primitive with a ResultCode indicating the security policy mismatch.

e. Otherwise, if the state for the STA or the Non-AP MLD is State 4, the STA or Non-AP MLD has a valid security association, the STA or Non-AP MLD has negotiated management frame protection, the STA or the Non-AP MLD has not performed a successful Simultaneous Authentication of Equals (SAE) authentication after the current association was established, and there has been no earlier, timed out SA query procedure with the STA or the Non-AP MLD (which would have allowed a new association process to be started, without an additional SA query procedure).

Herein, 1. The SME shall refuse the association request by issuing an MLME-ASSOCIATE.response primitive with ResultCode REFUSED_TEMPORARILY and TimeoutInterval containing a Timeout Interval element with the Timeout Interval Type field set to 3 (Association Comeback time). If the SME is in an ongoing SA query with the STA or the Non-AP MLD, the Timeout Interval Value field shall be set to the remaining SA query period, otherwise it should be set to dot11AssociationSAQueryMaximum Timeout or dot11MLDAssociationSAQueryMaximum Timeout.

2. The status for the STA or the Non-AP MLD shall be left unchanged.

3. Following this, if the SME is not in an ongoing SA query with the STA or the Non-AP MLD, the SME shall issue one MLME-SA-QUERY.request primitive addressed to the STA or the Non-AP MLD every dot11AssociationSAQueryRetryTimeout time units until an MLME-SA-QUERY.confirm primitive for the STA or the Non-AP MLD is received or dot11AssociationSAQueryMaximum Timeout time units or dot11MLDAssociationSAQueryMaximum Timeout time units from the beginning of the SA query procedure have passed. The SME shall increment the TransactionIdentifier by 1 for each MLME-SA-QUERY.request primitive, rolling it over the value to 0 after the maximum allowed value is reached.

4. If no MLME-SA-QUERY.confirm primitive for the STA or the Non-AP MLD is received within dot11AssociationSAQueryMaximum Timeout period or dot11MLDAssociationSAQueryMaximumTimeout period, the SME shall allow subsequent association process with the STA or the Non-AP MLD to be started without starting an additional SA query procedure, except that the SME may deny a subsequent association process with the STA or the Non-AP MLD if an MAC Service Data Unit (MSDU) was successfully received from the STA or any Non-AP STA affiliated with the Non-AP MLD within this period. Reception of the MSDU implies reception of a valid protected frame, which obviates the need for the SA query procedure.

The processing of the AP or the AP MLD for the reassociation request is similar to the processing for the association request, and will not be elaborated herein. It should be noted that during the processing of the AP MLD for the association request and/or the reassociation request, the AP MLD performs the processing at a level of the MLD.

Transition of Mobility Types

Three transition types of significance to the standard that describe the mobility of STAs or MLDs within a network are as follows: no transition, inter-BasicServiceSet (BSS) transition and inter-ExtendedServiceSet (ESS) transition. Herein, a Non-AP STA may transition to the Non-AP MLD when moving between BSSs (the MAC address of the Non-AP STA becomes the MLD MAC address of the Non-AP MLD), the Non-AP MLD may also transition to the Non-AP STA (the MLD MAC address of the Non-AP MLD becomes the MAC address of the Non-AP STA).

Multi-Link Reconfiguration

The protocol stipulates that a Non-AP MLD associated with an AP MLD may request to add at least one link and/or delete at least one link by transmitting a multi-link reconfiguration request.

In related arts, the security association negotiation is performed at the MLD level. However, according to the detection conditions stipulated in the current protocol, the AP MLD cannot accurately detect the following attacker: an attacker whose MAC address is different from the MAC address of a legit device, but whose affiliated STA has the same MAC address as the associated legit device or the STA affiliated with the legit device.

For convenience of understanding of the technical solutions of the embodiments of the disclosure, the technical solutions of the disclosure will be described in detail below with reference to specific embodiments. The above related technologies may be used as alternative solutions and may be combined with the technical solutions of the embodiments of the disclosure in various ways, all of which belong to the scope of protection of the embodiments of the disclosure. The embodiments of the disclosure include at least some of the following contents.

As illustrated in FIG. 5, a link control method provided by an embodiment of the disclosure is applied to an AP MLD, and the method includes the following operation S501.

At the operation S501, if the AP MLD receives a first frame transmitted by a first Non-AP STA affiliated with a first Non-AP MLD through a first AP affiliated with the AP MLD, and a first address of at least one second Non-AP STA among Non-AP STAs affiliated with the first Non-AP MLD satisfies a first condition and/or a second condition, the AP MLD transmits a first status code. Herein, the first frame is used for requesting an association and/or a reassociation and/or a multi-link reconfiguration. The first condition is related to at least one third Non-AP STA among Non-AP STAs affiliated with a second Non-AP MLD which is associated with the AP MLD. The second condition is related to fourth Non-AP STA(s) which are associated with a second AP affiliated with the AP MLD. The first status code is used for rejecting an association request and/or a reassociation request and/or a multi-link reconfiguration request.

The AP MLD receives the first frame transmitted by the first Non-AP MLD, and the first frame is used for requesting the association and/or the reassociation and/or the multi-link reconfiguration. It is understood that if the first Non-AP MLD is not associated with the AP MLD, the first frame is used for requesting the association. If the first Non-AP MLD is associated with the AP MLD, the first frame is used for requesting the reassociation or the multi-link reconfiguration.

In an embodiment of the disclosure, the first frame is used for requesting the association and/or the reassociation and/or the multi-link reconfiguration, which can be understood to mean that the AP MLD supports at least one scene among a scene where the first frame is used for requesting the association and/or the reassociation and a scene where the first frame is used for requesting the multi-link reconfiguration.

If the first frame is used for requesting the association and/or the reassociation, the AP MLD receives the first frame transmitted by the first Non-AP STA affiliated with the first Non-AP MLD through the affiliated first AP, and transmits a first status code for rejecting the association request and/or the reassociation request to the first Non-AP MLD in case of determining that the at least one second Non-AP STA affiliated with the first Non-AP MLD satisfies the first condition and/or the second condition.

If the first frame is used for requesting the multi-link reconfiguration, the AP MLD receives the first frame transmitted by the first Non-AP STA affiliated with the first Non-AP MLD through the affiliated first AP, and transmits a first status code for rejecting the multi-link reconfiguration request to the first Non-AP MLD in case of determining that the at least one second Non-AP STA affiliated with the first Non-AP MLD satisfies the first condition and/or the second condition.

The first condition is related to the at least one third Non-AP STA among the Non-AP STAs affiliated with the second Non-AP MLD which is associated with the AP MLD. It is understood that the selection range of the third Non-AP STA in the first condition includes the Non-AP STAs affiliated with the second Non-AP MLD which is associated with the AP MLD.

The second condition is related to at least one fourth Non-AP STA which is associated with the second AP affiliated with the AP MLD. It is understood that the selection range of the fourth Non-AP STA in the second condition includes the Non-AP STAs which are associated with the second AP affiliated with the AP MLD.

It is understood that for an AP MLD, there are two types of STAs with which associations can be established: a Non-AP MLD and a Non-AP STA. The Non-AP MLD is affiliated with at least one Non-AP STA. A STA is a Non-AP STA if there is no STA affiliated with it.

In an embodiment of the disclosure, an MLD MAC address of the first Non-AP MLD is different from an MLD MAC address of the second Non-AP MLD.

If the MLD MAC address of the first Non-AP MLD is the same as the MLD MAC address of the second Non-AP MLD, the AP MLD rejects the association request and/or the reassociation request and/or the multi-link reconfiguration request from the first Non-AP MLD based on the MLD MAC addresses of the two MLDs.

In the embodiment of the disclosure, the address may include a MAC address.

In the embodiment of the disclosure, the following two levels of associations are involved: a MLD level association, i.e., an association between an AP MLD and a Non-AP MLD; and a STA level association, i.e., an association between an AP affiliated with an AP MLD and a Non-AP STA.

It can be understood that for an AP MLD, an Non-AP STA establishes the STA level association with an AP affiliated with the AP MLD, and a Non-AP MLD establishes the MLD level association with the AP MLD (at least one affiliated Non-AP STA establishes a link with a respective affiliated AP and transitions to an associated state, i.e., the STA level association is established).

The first condition is a condition constructed based on the MLD level association, and the second condition is a condition constructed based on the STA level association. Therefore, according to the link control method provided by the embodiment of the disclosure, an AP MLD receives a first frame transmitted by a first Non-AP STA affiliated with a first Non-AP MLD, where the first frame is used for requesting an association and/or a reassociation and/or a multi-link reconfiguration; and determines that a first address of at least one second Non-AP STA among Non-AP STAs affiliated with the first Non-AP MLD satisfies a first condition and/or a second condition based on the first condition related to at least one third Non-AP STA among Non-AP STAs affiliated with a second Non-AP MLD which is associated with the AP MLD and/or the second condition related to fourth Non-AP STA(s) which are associated with a second AP affiliated with the AP MLD, in this case, the AP MLD rejects an association request and/or a reassociation request and/or a multi-link reconfiguration request from the first Non-AP MLD. Thus, whether the first Non-AP MLD is an attacker is determined based on the Non-AP STA under an MLD level association and/or the Non-AP STA under a STA level association, which enables the AP MLD to accurately distinguish whether a STA requesting an association and/or an reassociation and/or a multi-link reconfiguration with the AP MLD is a legit STA or an attacker.

In some embodiments, the at least one second Non-AP STA is the same as or different from the first Non-AP STA.

The at least one second Non-AP STA is the same as the first Non-AP STA, which can be understood to mean that the at least one second Non-AP STA includes the first Non-AP STA.

The at least one second Non-AP STA is different from the first Non-AP STA, which can be understood to mean that the at least one second Non-AP STA excludes the first Non-AP STA.

In some embodiments, the first condition includes: the first address of the at least one second Non-AP STA is the same as a second address of the at least one third Non-AP STA among the Non-AP STAs affiliated with the second Non-AP MLD.

If the first address of the at least one second Non-AP STA in the first Non-AP MLD is the same as the second address of the at least one third Non-AP STA affiliated with the second Non-AP MLD which is associated with the AP MLD, the AP MLD transmits the first status code to the first Non-AP MLD.

The first address of the at least one second Non-AP STA is the same as the second address of the at least one third Non-AP STA, which can be understood to mean that for each of the at least one second Non-AP STA, the first address of the second Non-AP STA is the same as the second address of one of the at least one third Non-AP STA.

When the first Non-AP MLD includes at least two Non-AP STAs, multiple Non-AP STAs may satisfy the first condition with one second Non-AP MLD, or multiple Non-AP STAs may satisfy the first condition with multiple different second Non-AP MLDs.

For example, STAs affiliated with a Non-AP MLD1 include Non-AP STA1 and Non-AP STA2, and the addresses of the Non-AP STA1 and the Non-AP STA2 are address 1 and address 2, respectively. STAs affiliated with a Non-AP MLD2 include Non-AP STA3 and Non-AP STA4, and the addresses of the Non-AP STA3 and the Non-AP STA4 are address 1 and address 2, respectively. Therefore, the addresses of the Non-AP STA1 and the Non-AP STA2 are the same as the addresses of the Non-AP STA3 and the Non-AP STA4, respectively. In this case, the Non-AP STA1 and the Non-AP STA2 satisfy the first condition with one second Non-AP MLD.

For example, STAs affiliated with a Non-AP MLD1 include Non-AP STA1 and Non-AP STA2, and the addresses of the Non-AP STA1 and the Non-AP STA2 are address 1 and address 2, respectively. STAs affiliated with a Non-AP MLD2 include Non-AP STA3 and Non-AP STA4, and the addresses of the Non-AP STA3 and the Non-AP STA4 are address 1 and address 3, respectively. STAs affiliated with a Non-AP MLD3 include Non-AP STA5 and Non-AP STA6, and the addresses of the Non-AP STA5 and the Non-AP STA6 are address 4 and address 2, respectively. Therefore, the address of the Non-AP STA1 is the same as the address of the Non-AP STA3, and the address of the Non-AP STA2 is the same as the address of the Non-AP STA6. That is, the Non-AP STA1 and the Non-AP STA2 satisfy the first condition with different second Non-AP MLDs, respectively.

In an example, as illustrated in FIG. 6, APs affiliated with the AP MLD include an AP1 and an AP2, a Non-AP MLD which is associated with the AP MLD includes a Non-AP MLD2, and STAs affiliated with the Non-AP MLD2 include a STA3 having a MAC address of MAC1 and a STA4 having a MAC address of MAC4. STAs affiliated with the Non-AP MLD1 include a STA1 having a MAC address of MAC1 and a STA2 having a MAC address of MAC2. If the Non-AP MLD1 transmits a first frame to the AP2 affiliated with the AP MLD through the affiliated STA2, and the MAC address of the STA1 is the same as the MAC address of the STA3 in the Non-AP MLD2, then the STA1 of the Non-AP MLD1 satisfies the first condition. In this case, the first Non-AP STA affiliated with the first Non-AP MLD is the STA2 affiliated with the Non-AP MLD1, the at least one second Non-AP STA affiliated with the first Non-AP MLD is the STA1 affiliated with the Non-AP MLD1, and the at least one third Non-AP STA affiliated with the second Non-AP MLD is the STA3 affiliated with the Non-AP MLD2. Herein, a link between the STA2 affiliated with the Non-AP MLD1 and the AP2 affiliated with the AP MLD is a link 2.

In an example, as illustrated in FIG. 6, APs affiliated with the AP MLD include an AP1 and an AP2, a Non-AP MLD which is associated with the AP MLD includes a Non-AP MLD2, and STAs affiliated with the Non-AP MLD2 include a STA3 having a MAC address of MAC1 and a STA4 having a MAC address of MAC4. STAs affiliated with the Non-AP MLD1 include a STA1 having a MAC address of MAC1 and a STA2 having a MAC address of MAC2. If the Non-AP MLD1 transmits a first frame to the AP1 affiliated with the AP MLD through the affiliated STA1, and the MAC address of the STA1 is the same as the MAC address of the STA3 in the Non-AP MLD2, then the STA1 of the Non-AP MLD1 satisfies the first condition. In this case, the first Non-AP STA affiliated with the first Non-AP MLD is the STA1 affiliated with the Non-AP MLD1, the at least one second Non-AP STA affiliated with the first Non-AP MLD is the STA1 affiliated with the Non-AP MLD1, and the at least one third Non-AP STA affiliated with the second Non-AP MLD is the STA3 affiliated with the Non-AP MLD2. Herein, a link between the STA1 affiliated with the Non-AP MLD1 and the AP1 affiliated with the AP MLD is a link 1.

Figure 7:
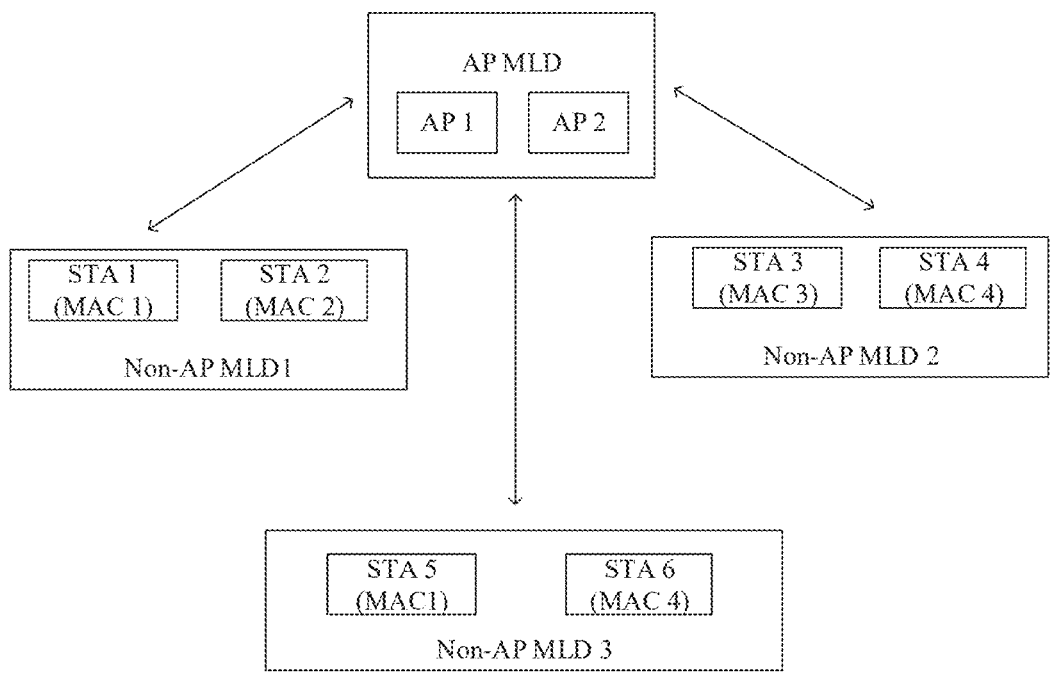
FIG. 7 is an optional diagram of an application scenario according to an embodiment of the disclosure.

In an example, as illustrated in FIG. 7, APs affiliated with the AP MLD include an AP1 and an AP2, Non-AP MLDs which are associated with the AP MLD include a Non-AP MLD1 and a Non-AP MLD2, STAs affiliated with the Non-AP MLD1 include a STA1 having a MAC address of MAC1 and a STA2 having a MAC address of MAC2, and STAs affiliated with the Non-AP MLD2 include a STA3 having a MAC address of MAC3 and a STA4 having a MAC address of MAC4. STAs affiliated with the Non-AP MLD3 include a STA5 having a MAC address of MAC1 and a STA6 having a MAC address of MAC4. If the Non-AP MLD3 transmits a first frame to the AP MLD through the affiliated STA5, and the MAC address of the STA5 is the same as the MAC address of the STA1 affiliated with the Non-AP MLD1 and the MAC address of the STA6 is the same as the MAC address of the STA4 affiliated with the Non-AP MLD2, then the STA5 and the STA6 of the Non-AP MLD3 each satisfy the first condition.

It is understood that when a state of a Non-AP STA affiliated with a Non-AP MLD is State 4, the affiliated Non-AP STA is associated with the corresponding affiliated AP in the AP MLD.

When the address of at least one Non-AP STA affiliated with a Non-AP MLD is the same as the address of the at least one second Non-AP STA affiliated with the first Non-AP MLD, there is a possibility of an address conflict between the Non-AP STA (i.e., the third Non-AP STA) and the at least one second Non-AP STA.

If the at least one second Non-AP STA is the same as the first Non-AP STA, and assuming that the AP MLD accepts the association request from the first Non-AP MLD (i.e., the first Non-AP MLD establishes an association with the AP MLD), both the first Non-AP STA and the at least one third Non-AP STA establish the association with the first AP. In this case, the first Non-AP STA and the at least one third Non-AP STA operate on the same link using the same address, i.e., there is an address conflict.

If the at least one second Non-AP STA is different from the first Non-AP STA, and assuming that the AP MLD accepts the association request from the first Non-AP MLD (i.e., the first Non-AP MLD establishes an association with the AP MLD), both the at least one second Non-AP STA and the at least one third Non-AP STA establish the association with an AP other than the first AP. In this case, the at least one second Non-AP STA and the at least one third Non-AP STA operate on the same link using the same address, i.e., there is an address conflict.

In the embodiment of the disclosure, when the address of the at least one second Non-AP STA affiliated with the first Non-AP MLD is the same as the address of the at least one third Non-AP STA affiliated with the second Non-AP MLD which is associated with the AP MLD, there is a possibility of an address conflict between Non-AP STAs affiliated with different Non-AP MLDs under the same AP affiliated with the AP MLD. Therefore, in the embodiment of the disclosure, when this possibility exists, the association request and/or the reassociation request and/or the multi-link reconfiguration are rejected, thereby avoiding the address conflict between Non-AP STAs, which establish associations with the same AP, affiliated with the Non-AP MLDs.

In some embodiments, the first condition further includes: the at least one second Non-AP STA operates on the same channel as the at least one third Non-AP STA.

Here, the operating on the same channel can also be understood as operating on the same frequency band and channel.

The at least one second Non-AP STA operates on the same channel as the at least one third Non-AP STA, which can be understood to mean that one second Non-AP STA operates on a same channel as one third Non-AP STA, and a different second Non-AP STA operates on another same channel as a different third Non-AP STA.

If the at least one second Non-AP STA operates on the same channel as the at least one third Non-AP STA, in a case that the first Non-AP MLD is associated with the AP MLD, the at least one second Non-AP STA and the at least one third Non-AP STA are associated with the same AP. In this case, there is an address conflict between the at least one second Non-AP STA and the at least one third Non-AP STA.

In an embodiment of the disclosure, when the at least one second Non-AP STA affiliated with the first Non-AP MLD and the at least one third Non-AP STA affiliated with the second Non-AP MLD establish a link or establish an association state with the same AP affiliated with the same AP MLD using the same address, the association request and/or the reassociation request and/or the reconfiguration link request from the first Non-AP MLD are rejected, thereby avoiding occurrence of a situation where different Non-AP STAs establish a link or establish an association state with the same AP affiliated with the same AP MLD using the same address.

In some embodiments, a channel on which the first AP operates is the same as or different from the channel on which the at least one second Non-AP STA operates.

In the embodiment of the disclosure, the AP MLD receives the first frame transmitted by the first Non-AP STA through a first link between the first AP and the first Non-AP STA. That is, the first AP operates on the same channel as the first Non-AP STA.

If the first Non-AP STA is the same as the at least one second Non-AP STA, the channel on which the first AP operates is the same as the channel on which the at least one second Non-AP STA operates. The channel on which the first AP operates is the same as the channel on which the at least one second Non-AP STA operates, which can be understood to mean that the channel information on which the first AP operates is the same as the channel information on which one of the at least one second Non-AP STA operates.

If the first Non-AP STA is different from the at least one second Non-AP STA, the channel on which the first AP operates is different from the channel on which the at least one second Non-AP STA operates. The channel on which the first AP operates is different from the channel on which the at least one second Non-AP STA operates, which can be understood to mean that the channel information on which the first AP operates is different from channel information on which any one of the at least one second Non-AP STA operates.

In some embodiments, the second condition includes: the first address of the at least one second Non-AP STA is the same as a third address of at least one fourth Non-AP STA among the Non-AP STAs which are associated with the second AP.

If the first address of the at least one second Non-AP STA in the first Non-AP MLD is the same as the third address of the at least one fourth Non-AP STA which is associated with the second AP affiliated with the AP MLD, the AP MLD transmits the first status code to the first Non-AP MLD.

The first address of the at least one second Non-AP STA is the same as the third address of the at least one fourth Non-AP STA among the Non-AP STAs which are associated with the second AP, which can be understood to mean that the first address of a different second Non-AP STA is the same as the third address of a different fourth Non-AP STA which is associated with the second AP.

It is understood that when a state of a Non-AP STA is State 4, the Non-AP STA is associated with an AP affiliated with the AP MLD.

When a state of a Non-AP STA is State 4 and an address of the Non-AP STA is the same as an address of the at least one second Non-AP MLD affiliated with the first Non-AP MLD, there is a possibility of an address conflict between the Non-AP STA (i.e., the fourth Non-AP STA) and the at least one second Non-AP STA.

The first address of the at least one second Non-AP STA is the same as the third address of the at least one fourth Non-AP STA which is associated with the second AP, which can be understood to mean that for each of the at least one second Non-AP STA, the first address of the second Non-AP STA is the same as the third address of one of the at least one fourth Non-AP STA.

In the embodiment of the disclosure, the AP MLD receives the first frame transmitted by the first Non-AP MLD through a first link between the first AP and the first Non-AP STA affiliated with the first Non-AP MLD. The second AP and the first AP may be the same or different.

Figure 8:
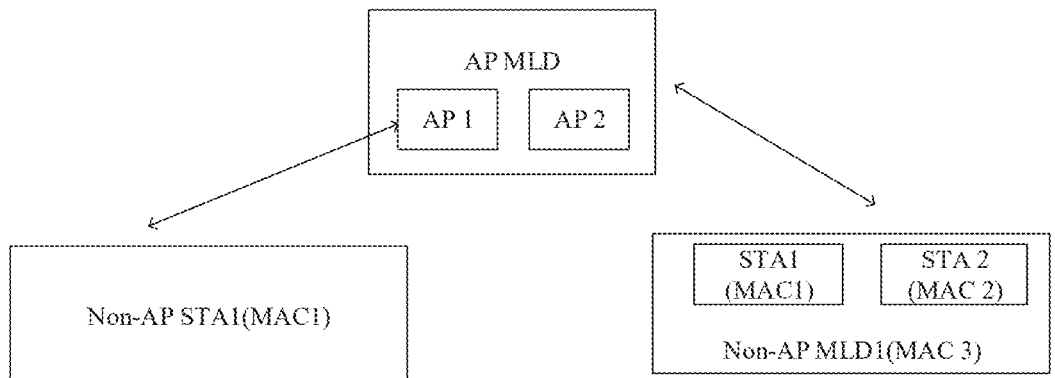
FIG. 8 is an optional diagram of an application scenario according to an embodiment of the disclosure.

In an example, as illustrated in FIG. 8, APs affiliated with the AP MLD include an AP1 and an AP2, and STAs affiliated with a Non-AP MLD1 include a STA1 having a MAC address of MAC1 and a STA2 having a MAC address of MAC2. A Non-AP STA1 having a MAC address of MAC1 is associated with the AP1. If the Non-AP MLD1 transmits a first frame to the AP2 affiliated with the AP MLD through the affiliated STA2, and in this case, the MAC address of the STA1 is the same as the MAC address of the Non-AP STA1, then the STA1 of the Non-AP MLD1 satisfies the second condition.

In an example, as illustrated in FIG. 9, APs affiliated with the AP MLD include an AP1 and an AP2, and STAs affiliated with a Non-AP MLD1 include a STA1 having a MAC address of MAC1 and a STA2 having a MAC address of MAC2. A Non-AP STA1 having a MAC address of MAC1 is associated with the AP1, and a Non-AP STA2 having a MAC address of MAC2 is associated with the AP2. If the Non-AP MLD1 transmits a first frame to the AP2 affiliated with the AP MLD through the affiliated STA2, and in this case, the MAC address of the STA1 is the same as the MAC address of the Non-AP STA1 and the MAC address of the STA2 is the same as the MAC address of the Non-AP STA2, then the STA1 and the STA2 of the Non-AP MLD1 each satisfy the second condition.

When an address of at least one Non-AP STA which is associated with the AP(s) affiliated with the AP MLD is the same as an address of the at least one second Non-AP STA affiliated with the first Non-AP MLD, there is a possibility of an address conflict between the Non-AP STA (i.e., the fourth Non-AP STA) and the at least one second Non-AP STA.

Assuming that the AP MLD accepts the association request from the first Non-AP MLD, i.e., in a case that the first Non-AP MLD establishes an association with the AP MLD, both a second Non-AP STA and a fourth Non-AP STA establish the association with the same AP affiliated with the AP MLD, and thus at least the second Non-AP STA and the fourth Non-AP STA operate on the same link using the same address, i.e., there is an address conflict.

In the embodiment of the disclosure, when the address of the at least one second Non-AP STA affiliated with the first Non-AP MLD is the same as the address of the at least one fourth Non-AP STA which is associated with the second AP affiliated with the AP MLD, there is a possibility of an address conflict between the Non-AP STA affiliated with the Non-AP MLD and the associated Non-AP STA under the same AP affiliated with the AP MLD. Therefore, in the embodiment of the disclosure, when this possibility exists, the association request and/or the reassociation request and/or the multi-link reconfiguration are rejected, thereby avoiding the address conflict between the Non-AP STA and the Non-AP STA affiliated with the Non-AP MLD, both of which establish associations with the same AP.

In some embodiments, the second condition further includes: the at least one second Non-AP STA operates on the same channel as the at least one fourth Non-AP STA.

Here, the operating on the same channel can also be understood as operating on the same frequency band and channel.

The at least one second Non-AP STA and the at least one fourth Non-AP STA operate on the same channel, and if the first Non-AP MLD is associated with the AP MLD, the at least one second Non-AP STA and the at least one fourth Non-AP STA are associated with the same AP (i.e., the second AP). In this case, there is an address conflict between the at least one second Non-AP STA and the at least one fourth Non-AP STA.

The at least one second Non-AP STA operates on the same channel as the at least one fourth Non-AP STA, which can be understood to mean that different second Non-AP STAs among the at least one second Non-AP STA and different fourth Non-AP STAs among the at least one fourth Non-AP STA operate on the respective same channels.

In the embodiment of the disclosure, when the at least one second Non-AP STA affiliated with the first Non-AP MLD and the at least one fourth Non-AP STA which is associated with the AP affiliated with the AP MLD establish a link or establish an association state with the second AP using the same address, the association request and/or the reassociation request and/or the reconfiguration link request from the first Non-AP MLD are rejected, thereby avoiding occurrence of a situation where different Non-AP STAs establish a link or establish an association state with the same AP affiliated with the same AP MLD using the same address.

In some embodiments, a channel on which the second AP operates is the same as the channel on which the at least one second Non-AP STA operates.

In the embodiment of the disclosure, the AP MLD receives the first frame transmitted by the first Non-AP STA through the first link between the first AP and the first Non-AP STA. That is, the first AP operates on the same channel as the first Non-AP STA.

In some embodiments, the second AP is the same as or different from the first AP.

If the first Non-AP STA is the same as the at least one second Non-AP STA, the at least one second Non-AP STA and the at least one fourth Non-AP STA operate on the same channel, and the channel on which the at least one fourth Non-AP STA operates is the channel on which the second AP operates, the first AP and the second AP are the same.

If the first Non-AP STA is different from the at least one second Non-AP STA, the at least one second Non-AP STA and the at least one fourth Non-AP STA operate on the same channel, and the channel on which the at least one fourth Non-AP STA operates is the channel on which the second AP operates, the first AP is different from the second AP.

In an example, as illustrated in FIG. 10, APs affiliated with the AP MLD include an AP1 and an AP2, and STAs affiliated with the Non-AP MLD1 include a STA1 having a MAC address of MAC1 and a STA2 having a MAC address of MAC2. A Non-AP STA1 having a MAC address of MAC1 is associated with the AP1 and a link 1 is established. If the Non-AP MLD1 transmits a first frame to the AP2 affiliated with the AP MLD through a link 2 between the affiliated STA2 and the AP2, and in this case, the MAC address of the STA1 is the same as the MAC address of the Non-AP STA1 which is associated with the AP1, then the STA1 of the Non-AP MLD1 satisfies the second condition, and the AP associated with the affiliated STA2 is different from the AP associated with the Non-AP STA satisfying the second condition.

In some embodiments, before the operation S501, the AP MLD further performs the following operation.

The AP MLD receives the first frame transmitted by the first Non-AP STA of the first Non-AP MLD through the first AP.

In some embodiments, the first frame includes at least one of: an association request frame, a reassociation request frame, or a multi-link reconfiguration request frame.

The association request frame can be used for at least one of: requesting the association or requesting the multi-link reconfiguration.

The reassociation request frame can be used for at least one of: requesting the reassociation or requesting the multi-link reconfiguration.

The multi-link reconfiguration request frame can be used for requesting the multi-link reconfiguration.

In some embodiments, the first frame is used for requesting the association and/or the reassociation with the AP MLD if the first frame includes a basic multi-link element.

In an example, if the AP MLD receives the association request frame transmitted by the first Non-AP STA of the first Non-AP MLD through the first AP and the association request frame carries the basic multi-link element, the association request frame is used for requesting the association with the AP MLD.

In an example, if the AP MLD receives the reassociation request frame transmitted by the first Non-AP STA of the first Non-AP MLD through the first AP and the reassociation request frame carries the basic multi-link element, the reassociation request frame is used for requesting the reassociation with the AP MLD.

In some embodiments, the base multi-link element includes the first address of the at least one second Non-AP STA affiliated with the first Non-AP MLD.

When the first Non-AP STA is different from the at least one second Non-AP STA, the base multi-link element includes an address of the first Non-AP STA and an address of the at least one second Non-AP STA.

It is understood that an affiliated STA corresponding to the address included in the basic multi-link element is an affiliated STA that requests to establish a link or establish an association state with a STA affiliated with the AP MLD.

It is understood that in addition to the address of the at least one second Non-AP STA, the basic multi-link element may also include addresses of Non-AP STAs other than the first Non-AP STA and/or the at least one second Non-AP STA among Non-AP STAs affiliated with the first Non-AP MLD.

In an example, in the application scenario as illustrated in FIG. 6, the basic multi-link element includes the MAC addresses of the STA1 and the STA2 affiliated with the Non-AP MLD1.

In some embodiments, the first frame is used for requesting the multi-link reconfiguration if the first frame includes a reconfiguration multi-link element.

In an example, if the AP MLD receives the association request frame transmitted by the first Non-AP STA of the first Non-AP MLD through the first AP and the association request frame carries the reconfiguration multi-link element, the association request frame is used for requesting the multi-link reconfiguration.

In an example, if the AP MLD receives the reassociation request frame transmitted by the first Non-AP STA of the first Non-AP MLD through the first AP and the reassociation request frame carries the reconfiguration multi-link element, the reassociation request frame is used for requesting the multi-link reconfiguration.

In an example, if the AP MLD receives the multi-link reconfiguration request frame transmitted by the first Non-AP STA of the first Non-AP MLD through the first AP and the multi-link reconfiguration request frame carries the reconfiguration multi-link element, the multi-link reconfiguration request frame is used for requesting the multi-link reconfiguration.

In some embodiments, the reconfiguration multi-link element includes the first address of the at least one second Non-AP STA affiliated with the first Non-AP MLD.

It is understood that an affiliated STA corresponding to the address included in the reconfiguration multi-link element is an affiliated STA of the first Non-AP MLD that requests to add a link in the case where the first Non-AP MLD establishes a multi-link with the AP MLD.

It is understood that in addition to the address of the at least one second Non-AP STA, the reconfiguration multi-link element may also include addresses of Non-AP STAs other than the first Non-AP STA and/or the at least one second Non-AP STA among Non-AP STAs affiliated with the first Non-AP MLD.

For a scenario 1 where the first frame is used for requesting the association/and or the reassociation, the first status code transmitted by the AP MLD includes the following two cases.

At a case A1, the first status code is used for rejecting the association request and/or the reassociation request from the first Non-AP MLD if the first frame is used for requesting the association and/or the reassociation with the AP MLD.

At a case A2, the first status code is used for temporarily rejecting the association request and/or the reassociation request from the first Non-AP MLD if the first frame is used for requesting the association and/or the reassociation with the AP MLD.

For the case A1, the first status code may be a reject code DENIED_STA_AFFILIATED_WITH_MLD_WITH_EX-ISTING_MLD_ASSOCIATION indicating that the affiliated STA is refused due to an existing association with the MLD.

When the AP MLD transmits the first status code, it indicates that the first Non-AP MLD should no longer request the association and/or the reassociation with the AP MLD.

For the case A1, the AP MLD does not initiate the SA query procedure.

For the case A2, the first status code may be a reject code REFUSED_TEMPORARILY indicating a temporary refusal.

When the AP MLD transmits the first status code, it indicates that the first Non-AP MLD can try to request an association with the AP MLD again after a certain period of time. That is, the first Non-AP MLD transmit the first frame indicating the association request and/or the reassociation request to the AP MLD again after the certain period of time.

In some embodiments of the case A2, the AP MLD further performs the following operation. The AP MLD initiates a security association query procedure for the second Non-AP MLD and/or for the fourth Non-AP STA.

If the first MAC address of the at least one second Non-AP STA satisfies the first condition, a security association query procedure for the second Non-AP MLD is initiated.

If the first MAC address of the at least one second Non-AP STA satisfies the second condition, a security association query procedure for the fourth Non-AP MLD is initiated.

In the link control method provided by the embodiment of the disclosure, a request of the first Non-AP MLD to establish an association (i.e., a link) can be directly rejected, or a request of the first Non-AP MLD to establish an association (i.e., a link) can be temporarily rejected, thereby satisfying different security requirements for link establishment in a flexible manner.

For a scenario 2 where the first frame is used for requesting the multi-link reconfiguration, the first status code transmitted by the AP MLD includes the following two cases.

At a case B1, the first status code is used for indicating rejection of the multi-link reconfiguration request if the first frame is used for requesting the multi-link reconfiguration.

At a case B2, the first status code is used for rejecting reconfiguration of conflicting link(s) in the first frame if the first frame is used for requesting the multi-link reconfiguration.

In the case B1, the AP MLD rejects all the links for which the first Non-AP MLD requests reconfiguration, i.e., directly rejects the multi-link reconfiguration request from the Non-AP MLD.

In the case B2, the AP MLD does not directly rejects all the links for which the first Non-AP MLD requests reconfiguration, but only rejects the conflicting link(s) among the links for which the Non-AP MLD requests reconfiguration. Herein, the conflicting link(s) are link(s) corresponding to at least one second Non-AP STA affiliated with the first Non-AP MLD.

In the link control method provided by the embodiment of the disclosure, the reconfiguration of all links for which the first Non-AP MLD requests reconfiguration can be directly rejected, or the reconfiguration of conflicting link(s) among the links for which the first Non-AP MLD requests reconfiguration can be rejected only, thereby satisfying different security requirements for link reconfiguration in a flexible manner.

An embodiment of the disclosure provides a link control method. As illustrated in FIG. 11, the method includes the following operation S1101.

At the operation S1101, if the AP MLD receives a second frame transmitted by a fifth Non-AP STA through a third AP affiliated with the AP MLD, and a fourth address of the fifth Non-AP STA satisfies a third condition, the AP MLD transmits a second status code. Herein, the second frame is used for requesting an association and/or a reassociation. The third condition is related to at least one sixth Non-AP STA affiliated with a third Non-AP MLD which is associated with the AP MLD. The second status code is used for rejecting an association request and/or a reassociation request from the fifth Non-AP STA.

It is understood that the link control method illustrated in FIG. 11 and the link control method illustrated in FIG. 5 may be implemented separately or together. When the link control method illustrated in FIG. 10 and the link control method illustrated in FIG. 5 are implemented together, the execution of the two methods may not affect each other.

The AP MLD receives the second frame transmitted by the fifth Non-AP STA, where the second frame is used for requesting the association and/or the reassociation. It is understood that the fifth Non-AP STA is not associated with the AP MLD.

If the AP MLD receives the second frame transmitted by the fifth Non-AP STA through the affiliated third AP, and determines that the fifth Non-AP STA satisfies the third condition, the AP MLD transmits the second status code for rejecting the association request and/or the reassociation request to the fifth Non-AP STA.

The third condition is related to the at least one sixth Non-AP STA among Non-AP STAs affiliated with the third Non-AP MLD which is associated with the AP MLD. It is understood that the selection range of the sixth Non-AP STA in the first condition includes the Non-AP STAs affiliated with the third Non-AP MLD which is associated with the AP MLD.

It is understood that for an AP MLD, there are two types of STAs with which associations can be established: a Non-AP MLD and a Non-AP STA. The Non-AP MLD is affiliated with at least one Non-AP STA. A STA is a Non-AP STA if there is no STA affiliated with it.

If an MLD MAC address of the fifth Non-AP STA is the same as an MLD MAC address of the third Non-AP MLD, the AP MLD rejects the association request and/or the reassociation request from the fifth Non-AP STA based on the two MLD MAC addresses being the same.

In the embodiment of the disclosure, the address may include a MAC address.

In the embodiment of the disclosure, the following two levels of associations are involved: a MLD level association, i.e., an association between an AP MLD and a Non-AP MLD; and a STA level association, i.e., an association between an AP affiliated with an AP MLD and a Non-AP STA.

It can be understood that for an AP MLD, a Non-AP STA establishes the STA level association with an AP affiliated with the AP MLD, and a Non-AP MLD establishes the MLD level association with the AP MLD (at least one affiliated Non-AP STA establishes a link with a respective affiliated AP and transitions to an associated state, i.e., the STA level association is established).

The third condition is a condition related to the Non-AP STA, which is constructed based on the MLD level association. Therefore, according to the link control method provided by the embodiment of the disclosure, the AP MLD receives the second frame transmitted by the fifth Non-AP STA, where the second frame is used for requesting association and/or reassociation; and determines that the fourth address of the fifth Non-AP STA satisfies the third condition based on the third condition related to the at least one sixth Non-AP STA among Non-AP STAs affiliated with the third Non-AP MLD which is associated with the AP MLD, in this case, the AP MLD rejects the association request and/or the reassociation request from the fifth Non-AP STA. Thus, whether the fifth Non-AP MLD is an attacker is determined based on the Non-AP STA(s) under the Non-AP STA association which are constructed based on the MLD level association, so that the AP MLD can accurately determine whether the Non-AP STA requesting association and/or reassociation with the AP MLD is a legit STA or an attacker.

In some embodiments, the third condition includes: the fourth address of the fifth Non-AP STA is the same as a fifth address of the at least one sixth Non-AP STA among Non-AP STAs affiliated with the third Non-AP MLD.

If the fourth address of the fifth Non-AP STA is the same as the fifth address of the sixth Non-AP STA affiliated with the third Non-AP MLD which is associated with the AP MLD, the AP MLD transmits the second status code to the fifth Non-AP STA.

It is understood that when a state of a Non-AP STA affiliated with a Non-AP MLD is State 4, the Non-AP STA affiliated with the Non-AP MLD is associated with an AP affiliated with the AP MLD.

When a state of the at least one Non-AP STA affiliated with a Non-AP MLD is State 4 and the address of the affiliated Non-AP STA(s) is the same as the address of the fifth Non-AP STA, there is a possibility of an address conflict between the affiliated Non-AP STA(s) (i.e., the sixth Non-AP STA(s)) and the fifth Non-AP STA.

In the embodiment of the disclosure, the AP MLD receives the second frame transmitted by the fifth Non-AP STA through a third link between the third AP and the fifth Non-AP STA.

In some embodiments, the third condition further includes: the fifth Non-AP STA operates on the same channel as the at least one sixth Non-AP STA.

Here, the operating on the same channel can also be understood as operating on the same frequency band and channel.

The fifth Non-AP STA and the sixth Non-AP STA operate on the same channel, and if the fifth Non-AP STA is associated with the AP MLD, the fifth Non-AP STA and the sixth Non-AP STA are associated with the same AP. In this case, there is an address conflict between the fifth Non-AP STA and the at least one sixth Non-AP STA.

In the embodiment of the disclosure, when the fifth Non-AP STA and the at least one sixth Non-AP STA affiliated with the third Non-AP MLD which is associated with the AP MLD establish a link or establish an association state with the third AP using the same address, the request for the association is rejected, thereby avoiding occurrence of a situation where the Non-AP STA and the affiliated Non-AP STA establish a link or establish an association state with the same AP affiliated with the AP MLD using the same address.

In some embodiments, the third AP operates on the same channel as the at least one sixth Non-AP STA operates.

In the embodiment of the disclosure, the AP MLD receives the second frame transmitted by the fifth Non-AP STA through the third link between the third AP and the fifth Non-AP STA. That is, the third AP and the fifth Non-AP STA operate on the same channel.

If the fifth Non-AP STA and the sixth Non-AP STA operate on the same channel, the sixth Non-AP STA and the third AP operate on the same channel.

In some embodiments, before the operation S1101, the AP MLD further performs the following operation.

The AP MLD receives the second frame transmitted by the fifth Non-AP STA through the third AP.

In some embodiments, the second frame includes at least one of: an association request frame or a reassociation request frame.

The second status code transmitted by the AP MLD includes the following two cases.

At a case C1, the second status code is used for rejecting the association request and/or the reassociation request from the fifth Non-AP STA.

At a case C2, the second status code is used for temporarily rejecting the association request and/or the reassociation request from the fifth Non-AP STA.

For the case C1, the second status code may be a reject code DENIED_STA_AFFILIATED_WITH_MLD_WITH_EXISTING_MLD_ASSOCIATION.

When the AP MLD transmits the second status code, it indicates that the fifth Non-AP STA should no longer request the association and/or the reassociation with the AP MLD.

For the case C2, the second status code may be a reject code REFUSED_TEMPORARILY.

When the AP MLD transmits the second status code, it indicates that the fifth Non-AP STA can try to request the association and/or the reassociation with the AP MLD again after a certain period of time. That is, the fifth Non-AP STA transmits the second frame for requesting the association and/or the reassociation to the AP MLD again after the certain period of time.

In some embodiments of the case C2, the AP MLD further performs the following operation. The AP MLD initiates a security association query procedure for the third Non-AP MLD.

In the link control method provided by the embodiment of the disclosure, a request of the fifth Non-AP STA to establish an association (i.e., a link) and/or a reassociation can be directly rejected, or a request of the fifth Non-AP STA to establish an association and/or a reassociation can be temporarily rejected, thereby satisfying different security requirements for link establishment in a flexible manner.

Hereinafter, the link control method provided by the embodiments of the disclosure will be further described.

Herein, the transition based on mobility types includes but is not limited to the following scenarios A to D.

Figure 12:
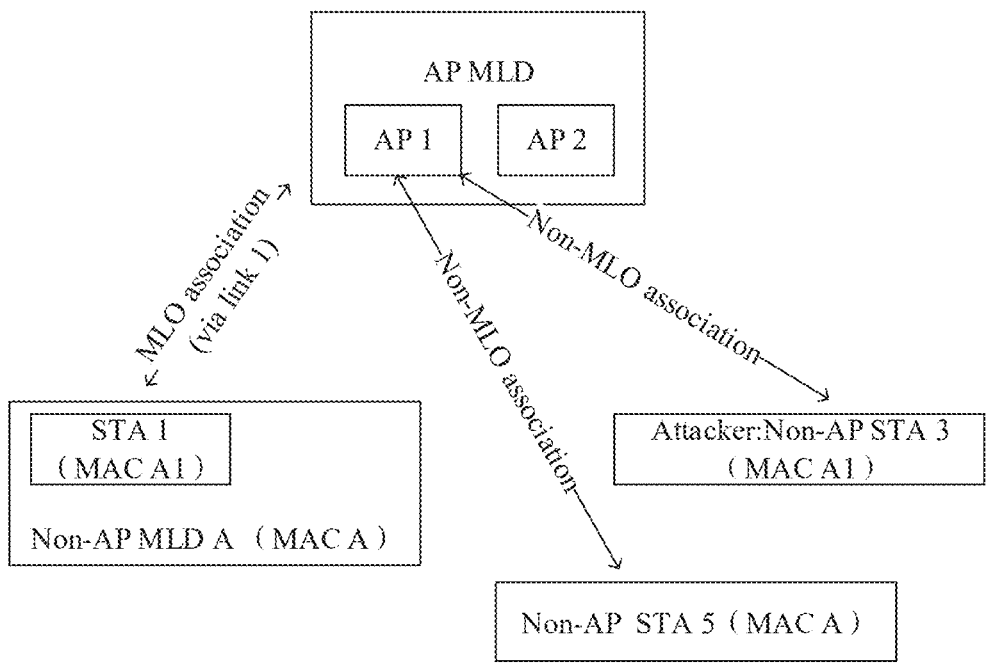
FIG. 12 is an optional diagram of an application scenario according to an embodiment of the disclosure.
Figure 13:
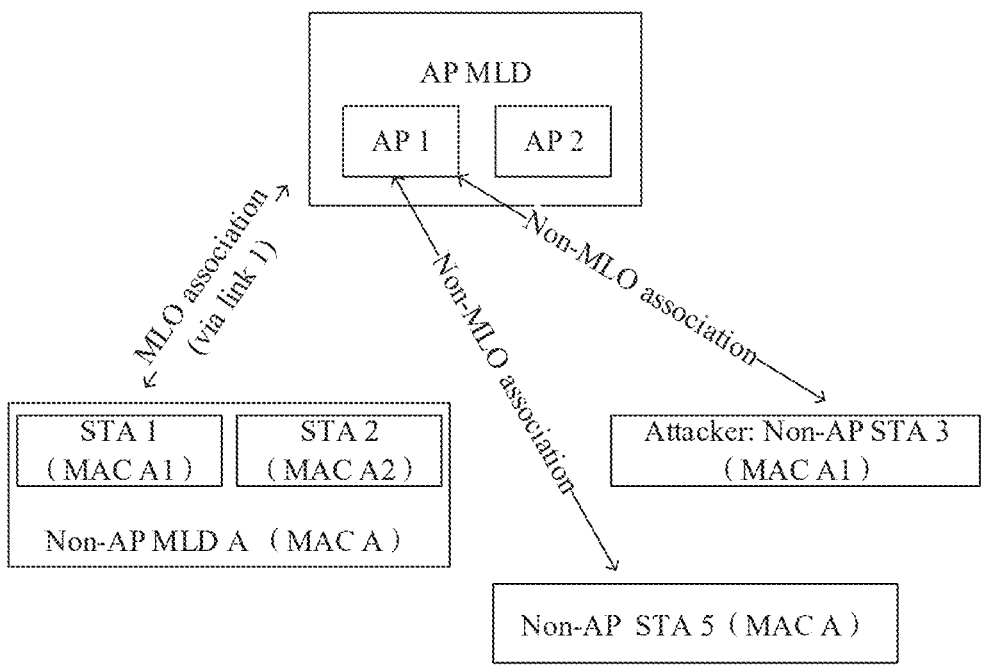
FIG. 13 is an optional diagram of an application scenario according to an embodiment of the disclosure.

In the scenario A as illustrated in FIG. 12 or FIG. 13, an associated legit Non-AP MLD A may be degraded (e.g., shutting down other affiliated STAs due to power-saving) to the Non-AP STA5, and then request to establish an association with the AP MLD. The MAC address of the Non-AP MLD A is MAC A, and the MAC address of the Non-AP STA5 is the same as that of the Non-AP MLD A, which is also MAC A. In FIG. 12, the Non-AP STA affiliated with the Non-AP MLD A includes a STA1 having a MAC address of MAC A1. In FIG. 13, Non-AP STAs affiliated with the Non-AP MLD A include a STA1 having a MAC address of MAC A1 and a STA2 having a MAC address of MAC A2. The AP MLD shall allow such legit situations. The AP MLD will perform an SA query procedure with the Non-AP MLD A based on the MAC A for verification.

However, for the Non-AP STA3 as an attacker in FIG. 12, the MAC address of the Non-AP STA3 is MAC A1. Because MAC A1 is different from MAC A, the Non-AP STA3 can establish an association with the AP1. In this case, the AP1 can be associated with the Non-AP STA3 and the STA1 affiliated with the Non-AP MLD A at the same time. This results in the downlink data from the AP MLD to the Non-AP STA3 causing a garbage traffic impact on the legit Non-AP MLD A, and that the uplink data from the legit Non-AP MLD A may be erroneously processed by the AP1 as the uplink data from the attacker (i.e., the Non-AP STA3), leading to a loss of the uplink data from the legit Non-AP MLD A.

In FIG. 12 or FIG. 13, the Non-AP MLD A establishes a Multi-Link Operation (MLO) association with the AP MLD through the link 1 between the STA1 and the AP1, the Non-AP STA5 establishes a Non-Multi-Link Operation (Non-MLO) association with the AP1 affiliated with the AP MLD, and the Non-AP STA3 establishes a Non-MLO association with the AP1 affiliated with the AP MLD.

Figure 14:
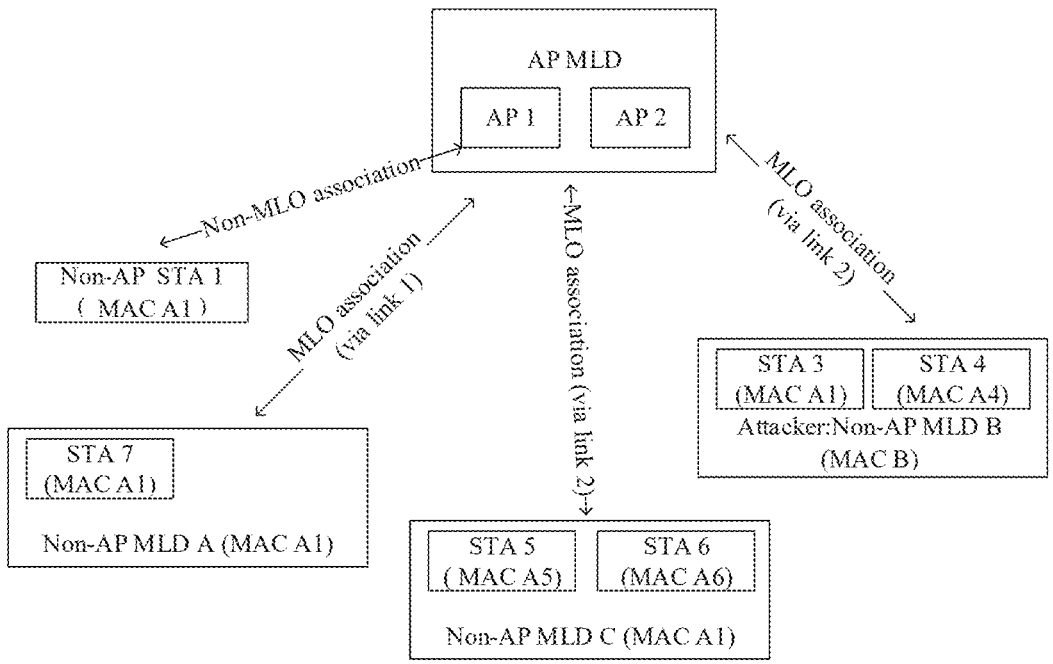
FIG. 14 is an optional diagram of an application scenario according to an embodiment of the disclosure.

In the scenario B as illustrated in FIG. 14, an associated legit Non-AP STA1 (having a MAC address of MAC A1) may be resumed (e.g., restarting other affiliated STAs that were previously shut down due to power-saving) to a Non-AP MLD A or Non-AP MLD C, and then request to establish an association with the AP MLD. The MAC address of the Non-AP MLD A or the Non-AP MLD C is the same as the MAC address of the Non-AP STA1, which is MAC A1. A Non-AP STA affiliated with the Non-AP MLD A includes a STA7 having a MAC address of MAC A1, and Non-AP STAs affiliated with the Non-AP MLD C include a STA5 having a MAC address of MAC A5 and a STA6 having a MAC address of MAC A6. The AP MLD shall allow such legit situations, and the AP MLD will perform an SA query procedure with the Non-AP STA1 based on the MAC A1 for verification.

However, for the attacker (i.e., the Non-AP MLD B) in FIG. 14, the MAC address of the Non-AP MLD B is MAC B. Non-AP STAs affiliated with the Non-AP MLD B include: a STA3 having a MAC address of MAC A1 and a STA4 having a MAC address of MAC A4. Because the MAC address of Non-AP MLD B is MAC B, which is different from the MAC A1 of the Non-AP STA1, the attacker (i.e., the Non-AP MLD B) can establish an association with the AP MLD. This results in the downlink data from the AP MLD to the attacker (i.e., the Non-AP MLD B) causing a garbage traffic impact on the legit Non-AP STA1, and that the uplink data from the legit Non-AP STA1 may be erroneously processed by the AP1 as the uplink data from the attacker (i.e., the Non-AP MLD B), leading to a loss of the uplink data from the legit Non-AP STA1.

In FIG. 14, a Non-MLO association is established between the Non-AP STA1 and the AP1 affiliated with the AP MLD, an MLO association is established between the Non-AP MLD A and the AP MLD through a link 1 between the STA7 affiliated with the Non-AP MLD A and the AP1 affiliated with the AP MLD, and an MLO association is established between the Non-AP MLD C and the AP MLD through a link 2 between the STA6 affiliated with the Non-AP MLD C and the AP2 affiliated with the AP MLD.

Figure 15:
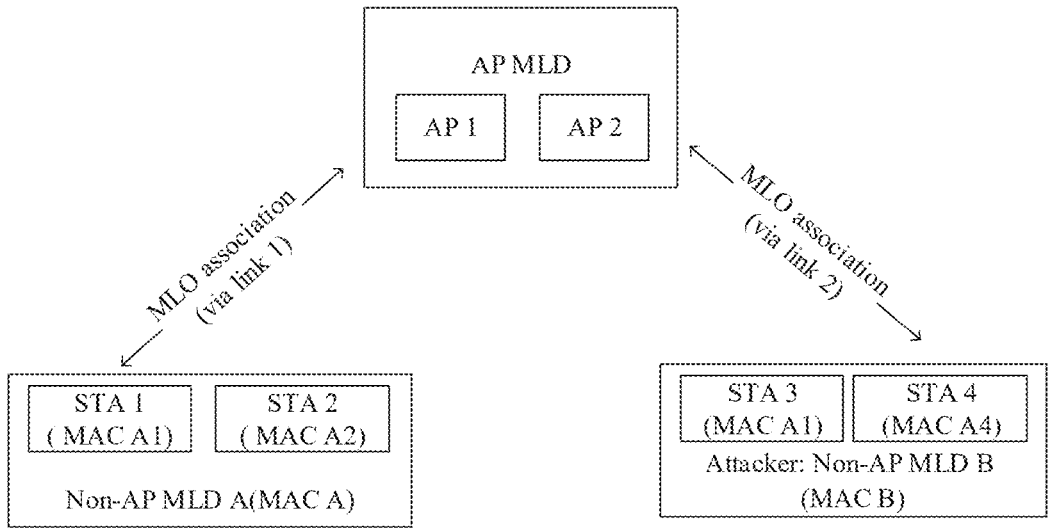
FIG. 15 is an optional diagram of an application scenario according to an embodiment of the disclosure.
Figure 16:
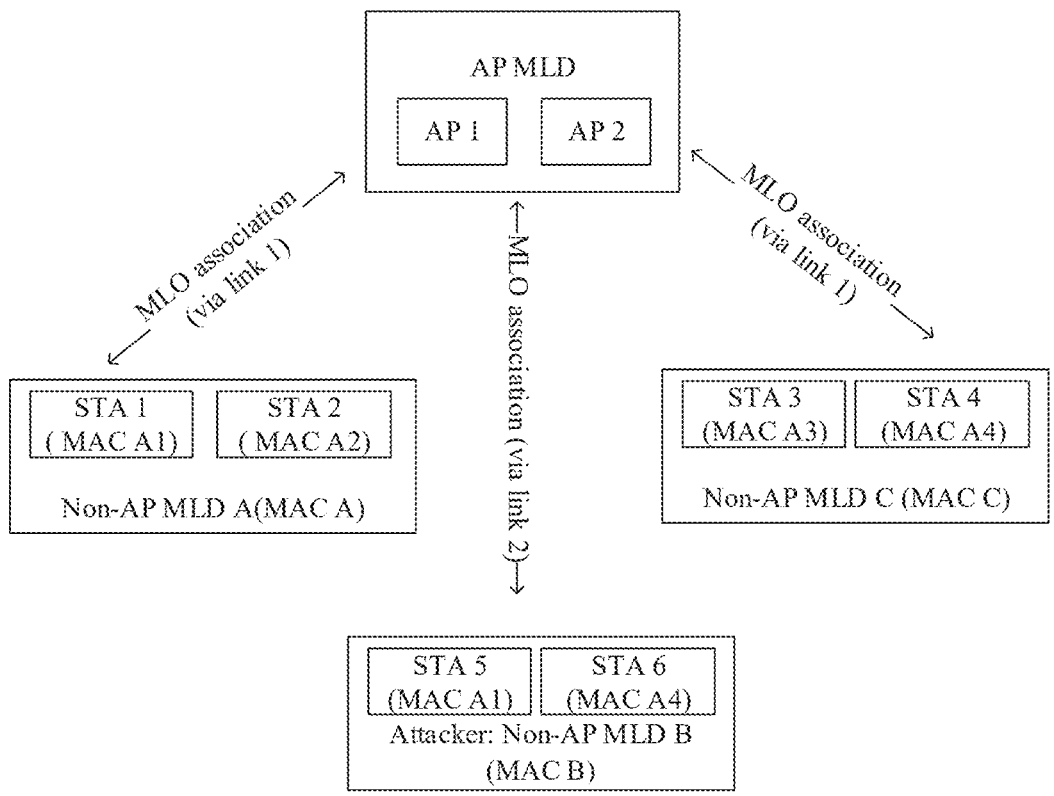
FIG. 16 is an optional diagram of an application scenario according to an embodiment of the disclosure.

In the scenario C as illustrated in FIG. 15 or FIG. 16, the MAC address of the Non-AP MLD A is MAC A, and the MAC address of the attacker (i.e., the Non-AP MLD B) is MAC B, thus the attacker (i.e., the Non-AP MLD B) adopts a MAC address that is different from that of the associated legit Non-AP MLD to associate with the AP MLD. At least one affiliated STA of the attacker (i.e., the Non-AP MLD B) and at least one affiliated STA of the associated legit Non-AP MLD have the same MAC address (for example, in FIG. 15, the MAC address of the STA3 affiliated with the Non-AP MLD B is MAC A1, which is the same as the MAC address of the STA1 affiliated with the Non-AP MLD A. For another example, in FIG. 16, the MAC address of the STA5 affiliated with the Non-AP MLD B is MAC A1, which is the same as the MAC address of the STA1 affiliated with the Non-AP MLD A; and the MAC address of the STA6 affiliated with the Non-AP MLD B is MAC A4, which is the same as the MAC address of the STA4 affiliated with the legit Non-AP MLD C) and operate on the same frequency band and the same channel. According to the current standard, the attacker (i.e., the Non-AP MLD B) can establish an association with the AP MLD, which results in the downlink data from the AP MLD to the attacker (i.e., the Non-AP MLD B) causing a garbage traffic impact on the associated legit STA or the associated legit Non-AP MLD, and that the uplink data from the legit Non-AP MLD may be erroneously processed by the AP MLD as the uplink data from the attacker (i.e., the Non-AP MLD B), leading to a loss of the uplink data from the legit Non-AP MLD.

In FIG. 15, an MLO association is established between the Non-AP MLD A and the AP MLD through a link 1 between the STA1 affiliated with the Non-AP MLD A and the AP1 affiliated with the AP MLD, and an MLO association is established between the attacker (i.e., the Non-AP MLD B) and the AP MLD through a link 2 between the STA4 affiliated with the Non-AP MLD B and the AP2 affiliated with the AP MLD.

In FIG. 16, an MLO association is established between the Non-AP MLD A and the AP MLD through a link 1 between the STA1 affiliated with the Non-AP MLD A and the AP1 affiliated with the AP MLD, an MLO association is established between the Non-AP MLD C and the AP MLD through a link 1 between the STA3 affiliated with the Non-AP MLD C and the AP1 affiliated with the AP MLD, and an MLO association is established between the attacker (i.e., the Non-AP MLD B) and the AP MLD through a link 2 between the STA5 affiliated with Non-AP MLD B and the AP2 affiliated with the AP MLD.

Figure 17:
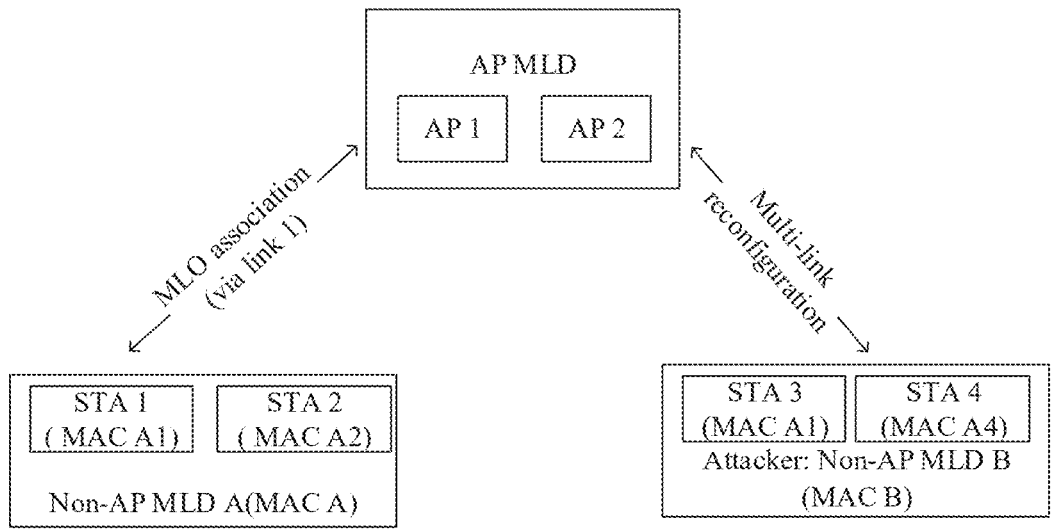
FIG. 17 is an optional diagram of an application scenario according to an embodiment of the disclosure.
Figure 18:
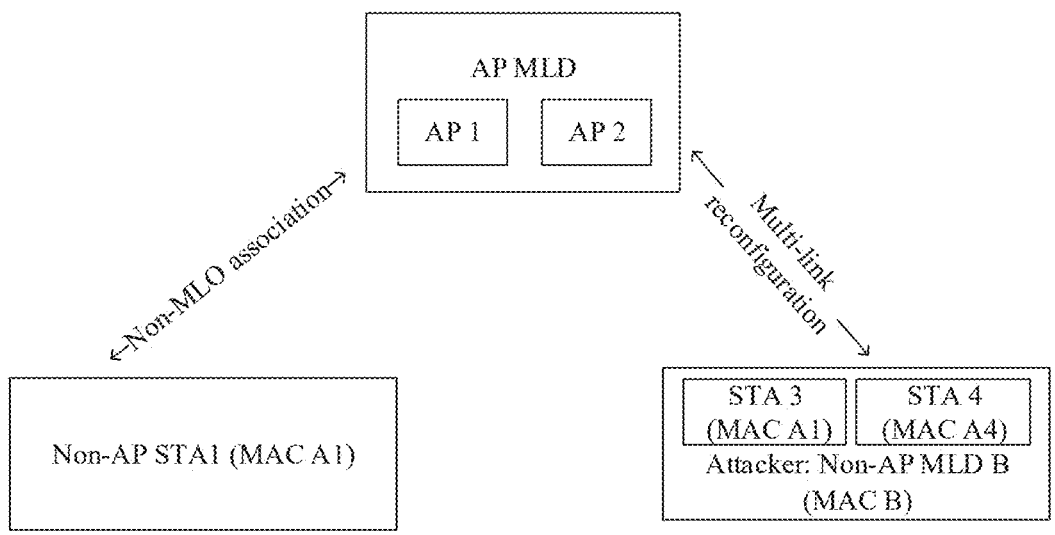
FIG. 18 is an optional diagram of an application scenario according to an embodiment of the disclosure.

In the scenario D as illustrated in FIG. 17 or FIG. 18, the attacker (i.e., the Non-AP MLD B) may add at least one new link in the case where the attacker (i.e., the Non-AP MLD B) is associated with the AP MLD. At least one newly added affiliated STA of the attacker (i.e., the Non-AP MLD B), and at least one affiliated STA of the associated legit Non-AP MLD or the associated legit Non-AP STA have the same MAC address and operate on the same frequency band and the same channel. In this case, if the AP MLD accepts the request for the newly added link(s), it will result in the downlink data from the AP MLD to the attacker (i.e., the Non-AP MLD B) causing a garbage traffic impact on the associated legit STA or the associated legit Non-AP MLD, and that the uplink data from the legit Non-AP MLD may be erroneously processed by the AP MLD as the uplink data from the attacker (i.e., the Non-AP MLD B), leading to a loss of the uplink data from the legit Non-AP MLD.

As illustrated in FIG. 17, if the AP MLD is associated with the legit Non-AP MLD A and is associated with the attacker (i.e., the Non-AP MLD B), the Non-AP MLD B transmits a link reconfiguration request to the AP MLD, and the newly added affiliated STA is the STA3. The STA3 and the STA1 in the Non-AP MLD A have the same MAC address which is MAC A1 and operate on the same frequency band and the same channel. If the AP MLD accepts the reconfiguration request, it will result in a garbage traffic impact on the Non-AP MLD A and a loss of the uplink data from the Non-AP MLD A.

As illustrated in FIG. 18, if the AP MLD is associated with the legit Non-AP STA1 and is associated with the attacker (i.e., the Non-AP MLD B), the Non-AP MLD B transmits a link reconfiguration request to the AP MLD, and the newly added affiliated STA is the STA3. The STA3 and the Non-AP STA1 have the same MAC address which is MAC A1 and operate on the same frequency band and the same channel. If the AP MLD accepts the reconfiguration request, it will result in a garbage traffic impact on the Non-AP STA1 and a loss of the uplink data from the Non-AP MLD A.

The link control method provided by the embodiments of the disclosure can be implemented as including, but not limited to, the following embodiments.

First Embodiment: All Rejected

For the scenario A

When the AP MLD receives an association request frame and/or a reassociation request frame transmitted by the fifth Non-AP STA through the third AP affiliated with the AP MLD, and if the third condition is satisfied, the AP MLD shall reject the association request with the status code DENIED_STA_AFFILIATED_WITH_MLD_WITH_EX-ISTING_MLD_ASSOCIATION.

The third condition is that the MAC address of the fifth Non-AP STA is the same as the MAC address of the sixth Non-AP STA. The sixth Non-AP STA is one of multiple Non-AP STAs affiliated with any third Non-AP MLD which is associated with the AP MLD, and the sixth Non-AP STA operates on the same frequency band and the same channel (i.e., the frequency band and channel on which the third AP operates) as the fifth Non-AP STA.

The following procedure shall be used by an AP or PCP upon receipt of an association request frame from a STA.

The MLME shall issue an MLME-ASSOCIATE.indication primitive to inform the SME of the association request. The SME shall issue an MLME-ASSOCIATE.response primitive addressed to the STA identified by the PeerSTAAddress parameter of the MLME-ASSOCIATE.indication primitive. If the association is not successful, the SME shall indicate a specific reason for the failure to associate in the ResultCode parameter. Upon receipt of the MLME-ASSOCIATE.response primitive, the MLME shall transmit an Association Response frame.

If there is at least one of Non-AP STAs affiliated with the Non-AP MLD (i.e., the state of the Non-AP MLD is State 4) associated with the AP MLD, which has the same MAC address and operates on the same channel as the STA, the AP shall reject the association request with a status code of DENIED_STA_AFFILIATED_WITH_MLD_WITH_EXISTING_MLD_ASSOCIATION.

In some examples, as illustrated in FIG. 12 or FIG. 13, when the AP MLD receives an association request and/or a reassociation request from the attacker (i.e., the Non-AP STA3) through the AP1, the MAC address of the Non-AP STA3 is the same as the MAC address of the STA1 affiliated with the Non-AP MLD which is associated with the AP1 affiliated with the AP MLD, and the Non-AP STA3 and the STA1 affiliated with the Non-AP MLD operate on the same frequency band and the same channel, in this case, the AP MLD transmits an association response frame carrying the status code DENIED_STA_AFFILIATED_WITH_MLD_WITH_EXISTING_MLD_ASSOCIATION to the Non-AP STA3 for rejecting the association request.

For the Scenario B

When the AP MLD receives an association request frame and/or a reassociation request frame transmitted by the first Non-AP STA affiliated with the first Non-AP MLD through the first AP affiliated with the AP MLD, and if the second condition is satisfied, the AP MLD shall reject the association of request with the status code DENIED_STA_AFFILIATED_WITH_MLD_WITH_EXISTING_MLD_ASSOCIATION. The second condition is that the MAC address of the second Non-AP STA affiliated with the first Non-AP MLD is the same as the MAC address of the fourth Non-AP STA. The fourth Non-AP STA is any one of the Non-AP STAs which are associated with the second AP affiliated with the AP MLD, and the fourth Non-AP STA and the second Non-AP STA operate on the same frequency band and the same channel (i.e., the frequency band and the channel on which the second AP operates).

The following procedure shall be used if an AP MLD receives an association request frame (or an reassociation request frame) with basic multi-link element from a Non-AP STA affiliated with a Non-AP MLD through an AP affiliated with the AP MLD.

The MLME shall issue an MLME-ASSOCIATE.indication primitive to inform the SME of the association request. The SME shall issue an MLME-ASSOCIATE.response primitive addressed to the Non-AP MLD identified by the PeerSTAAddress parameter of the MLME-ASSOCIATE.indication primitive. If the association is not successful, the SME shall indicate a specific reason for the failure to associate in the ResultCode parameter. Upon receipt of the MLME-ASSOCIATE.response primitive, the MLME shall transmit an association response frame.

If there is at least one Non-AP STA (i.e., the state of the Non-AP STA is State 4) associated with the second AP of the AP MLD, which has the same MAC address and operates on the same channel as at least one of Non-AP STAs affiliated with the Non-AP MLD, the AP MLD shall reject the association request with a status code of DENIED_STA_AFFILIATED_WITH_MLD_WITH_EXISTING_MLD_ASSOCIATION.

In an example, as illustrated in FIG. 14, when the AP MLD receives an association request and/or a reassociation request transmitted by the STA4 of the attacker (i.e., the Non-AP MLD B) through the AP2, the MAC address included in the basic multi-link element carried by the Non-AP STA4 includes the MAC address (i.e., the MAC A1) of STA3, the MAC address of the STA3 is the same as the MAC address of the Non-AP STA1 which is associated with the AP1 affiliated with the AP MLD, and the Non-AP STA3 and the Non-AP STA1 operate on the same frequency band and the same channel, i.e., the frequency band and the channel on which the AP1 operates, in this case, the AP MLD transmits an association response frame carrying the status code DENIED_STA_AFFILIATED_WITH_MLD_WITH_EXISTING_MLD_ASSOCIATION to the Non-AP MLD B for rejecting the association request.

For the Scenario C

When the AP MLD receives, through the first AP affiliated with the AP MLD, an association request frame and/or a reassociation request frame containing a basic multi-link element transmitted by the first Non-AP MLD through the first Non-AP STA affiliated with the first Non-AP MLD, and if the basic multi-link element satisfies the first condition, the AP MLD shall reject the association with the status code request DENIED_STA_AFFILIATED_WITH_MLD_WITH_EXISTING_MLD_ASSOCIATION. The first condition is that the MAC address of at least one affiliated second Non-AP STA included in the base multi-link element is the same as the MAC address of the third Non-AP STA. The third Non-AP STA is one of multiple Non-AP STAs affiliated with any second Non-AP MLD which is associated with the AP MLD, and the second Non-AP STA and the third Non-AP STA operate on the same frequency band and the same channel (which may be the same as or different from the frequency band and the channel on which the first AP operates).

Specifically, the following procedure shall be used if an AP MLD receives an association request frame (or an reassociation request frame) with basic multi-link element from a Non-AP STA affiliated with a Non-AP MLD through an AP affiliated with the AP MLD.

The MLME shall issue an MLME-ASSOCIATE.indication primitive to inform the SME of the association request. The SME shall issue an MLME-ASSOCIATE.response primitive addressed to the Non-AP MLD identified by the PeerSTAAddress parameter of the MLME-ASSOCIATE.indication primitive. If the association is not successful, the SME shall indicate a specific reason for the failure to associate in the ResultCode parameter. Upon receipt of the MLME-ASSOCIATE.response primitive, the MLME shall transmit an association response frame.

If there is at least one (i.e. the state of the Non-AP STA is State 4) of the Non-AP STAs affiliated with a Non-AP MLD associated with the AP MLD, which has the same MAC address and operates on the same channel as at least one of the Non-AP STAs affiliated with the Non-AP MLD, the AP MLD shall reject the association request with a status code of DENIED_STA_AFFILIATED_WITH_MLD_WITH_EXISTING_MLD_ASSOCIATION.

In an example, as illustrated in FIG. 15, when the AP MLD receives an association request and/or a reassociation request transmitted by the STA4 of the attacker (i.e., the Non-AP MLD B) through the AP2, the MAC address included in the basic multi-link element carried by the Non-AP STA4 includes the MAC address (i.e., MAC A1) of the STA3. The MAC address of the STA3 is the same as the MAC address of the Non-AP STA1 affiliated with the Non-AP MLD A which is associated with the AP MLD, the Non-AP STA3 and the Non-AP STA1 operate on the same frequency band and the same channel, and the frequency band and channel on which the Non-AP STA1 operates are different from the frequency band and channel on which the AP2 operates, in this case, the AP MLD transmits a status code of DENIED_STA_AFFILIATED_WITH_MLD_WITH_EXISTING_MLD_ASSOCIATION to the Non-AP MLD B for rejecting the association request.

In an example, as illustrated in FIG. 16, when the AP MLD receives an association request and/or a reassociation request transmitted by the STA6 of the attacker (i.e., the Non-AP MLD B) through the AP2, the MAC addresses included in the basic multi-link element carried by the Non-AP STA6 include the MAC address (i.e., MAC A1) of STA5 and the MAC address (i.e., MAC A4) of STA6, the MAC address of STA5 is the same as the MAC address of the STA1 affiliated with the Non-AP MLD A which is associated with the AP MLD and the STA5 and the STA1 operate on the same frequency band and the same channel, the frequency band and channel on which the STA1 operates are different from the frequency band and channel on which the AP2 operates, the MAC address of the STA6 is the same as the MAC address of the STA4 affiliated with the Non-AP MLD C which is associated with the AP MLD and the STA6 and the STA4 operate on the same frequency band and the same channel, and the frequency band and channel on which the STA4 operates are the same as the frequency band and channel on which the AP2 operates, in this case, the AP MLD transmits a status code of DENIED_STA_AFFILIATED_WITH_MLD_WITH_EXISTING_MLD_ASSOCIATION to the Non-AP MLD B for rejecting the association request.

For the Scenario D

When the AP MLD receives, through the first AP affiliated with the AP MLD, an association request frame and/or a reassociation request frame and/or a multi-link reconfiguration request frame containing a reconfiguration multi-link element transmitted by the first Non-AP MLD through the first Non-AP STA affiliated with the first Non-AP MLD, and if the reconfiguration multi-link element satisfies a fourth condition, the AP MLD shall reject the multi-link reconfiguration request and/or reject the association request. The fourth condition is that the MAC address of at least one affiliated Non-AP STA included in the reconfiguration multi-link element is the same as the MAC address of a seventh Non-AP STA. The seventh Non-AP STA is one of multiple Non-AP STAs affiliated with any second Non-AP MLD which is associated with the AP MLD. Alternatively, the seventh Non-AP STA is one of multiple Non-AP STAs which are associated with the second AP affiliated with the AP MLD. The seventh Non-AP STA and the second Non-AP STA operate on the same frequency band and the same channel (which may be the same as or different from the frequency band and the channel on which the first AP operates).

The MAC address of at least one affiliated Non-AP STA included in the reconfiguration multi-link element may be understood as the MAC address of at least one link to be added.

In an example, as illustrated in FIG. 17, when the AP MLD receives a multi-link reconfiguration request transmitted by the STA4 of the attacker (i.e., the Non-AP MLD B) through the AP2, the MAC address included in the reconfiguration multi-link element carried by the Non-AP STA4 includes the MAC address (i.e., MAC A1) of the STA3, the MAC address of the STA3 is the same as the MAC address of the Non-AP STA1 affiliated with the Non-AP MLD A which is associated with the AP MLD, and the Non-AP STA3 and the Non-AP STA1 operate on the same frequency band and the same channel as well as the frequency band and channel on which the Non-AP STA1 operates are different from the frequency band and channel on which the AP2 operates, in this case, the AP MLD transmits a status code to the Non-AP MLD B for rejecting the multi-link reconfiguration request.

In an example, as illustrated in FIG. 18, when the AP MLD receives a multi-link reconfiguration request transmitted by the STA4 of the attacker (i.e., the Non-AP MLD B) through the AP2, the MAC address included in the reconfiguration multi-link element carried by the Non-AP STA4 includes the MAC address (i.e., MAC A1) of the STA3, the MAC address of the STA3 is the same as the MAC address of the Non-AP STA1 associated with the AP1 and the Non-AP STA3 and the Non-AP STA1 operate on the same frequency band and the same channel, and the frequency band and channel on which the Non-AP STA1 operates are the same as the frequency band and channel on which the AP1 operates, in this case, the AP MLD transmits a status code to the Non-AP MLD B for rejecting the multi-link reconfiguration request.

Second Embodiment

For the Scenario A

When the AP MLD receives an association request frame and/or a reassociation request frame transmitted by the fifth Non-AP STA through the third AP affiliated with the AP MLD, and if the third condition is satisfied, the AP MLD shall reject the association request with a status code of REFUSED_TEMPORARILY and initiate a SA query procedure. The third condition is that the MAC address of the fifth Non-AP STA is the same as the MAC address of the sixth Non-AP STA. The sixth Non-AP STA is one of multiple Non-AP STAs affiliated with any third Non-AP MLD which is associated with the AP MLD, and the sixth Non-AP STA operates on the same frequency band and the same channel (i.e., the frequency band and channel on which the third AP operates) as the fifth Non-AP STA.

For the Scenario B

When the AP MLD receives an association request frame and/or a reassociation request frame transmitted by the first Non-AP STA affiliated with the first Non-AP MLD through the first AP affiliated with the AP MLD, and if the second condition is satisfied, the AP MLD shall reject the association request with the status code of REFUSED_TEMPORARILY and initiate a SA query procedure. The second condition is that the MAC address of the second Non-AP STA affiliated with the first Non-AP MLD is the same as the MAC address of the fourth Non-AP STA. The fourth Non- AP STA is any one of the Non-AP STAs which are associated with the second AP affiliated with the AP MLD, and the fourth Non-AP STA and the second Non-AP STA operate on the same frequency band and the same channel (i.e., the frequency band and the channel on which the second AP operates).

For the Scenario C

When the AP MLD receives, through the first AP affiliated with the AP MLD, an association request frame and/or a reassociation request frame containing a basic multi-link element transmitted by the first Non-AP MLD through the first Non-AP STA affiliated with the first Non-AP MLD, and if the basic multi-link element satisfies the first condition, the AP MLD shall reject the request association with the status code DENIED_STA_AFFILIATED_WITH_MLD_WITH_EXISTING_MLD_ASSOCIATION. The first condition is that the MAC address of at least one affiliated Non-AP STA (denoted as second Non-AP STA) included in the base multi-link element is the same as the MAC address of the third Non-AP STA. The third Non-AP STA is one of multiple Non-AP STAs affiliated with any second Non-AP MLD which is associated with the AP MLD, and the second Non-AP STA and the third Non-AP STA operate on the same frequency band and the same channel (which may be the same as or different from the frequency band and the channel on which the first AP operates).

For the Scenario D

When the AP MLD receives, through the first AP affiliated with the AP MLD, an association request frame and/or a reassociation request frame and/or a multi-link reconfiguration request frame containing a reconfiguration multi-link element transmitted by the first Non-AP MLD through the first Non-AP STA affiliated with the first Non-AP MLD, and if the reconfiguration multi-link element satisfies the fourth condition, the AP MLD shall reject conflicting link(s) in the multi-link reconfiguration request and/or reject conflicting link(s) in the association request. The fourth condition is that the MAC address of at least one affiliated Non-AP STA (denoted as second Non-AP STA) included in the reconfiguration multi-link element is the same as the MAC address of a seventh Non-AP STA. The seventh Non-AP STA is one of multiple Non-AP STAs affiliated with any second Non-AP MLD which is associated with the AP MLD. Alternatively, the seventh Non-AP STA is one of multiple Non-AP STAs which are associated with the second AP affiliated with the AP MLD. The seventh Non-AP STA and the second Non-AP STA operate on the same frequency band and the same channel (which may be the same as or different from the frequency band and the channel on which the first AP operates).

In the embodiment of the disclosure, different scenarios in the above-described first embodiment and second embodiment can be arbitrarily combined. For example, in case of the scenario C in the second embodiment, the scenario A in the second embodiment or the scenario B in the second embodiment can be implemented.

In the scenario C, the AP MLD may also reject the association request with a status code of REFUSED_TEMPORARILY and initiate a SA query procedure if the MAC address included in the basic multi-link element satisfies the first condition.

Methods for the AP and/or the AP MLD to process the association request and/or the reassociation request are specified in the protocol. The embodiments of the disclosure improve upon the methods by introducing the following new conditions for rejecting the association request.

When the AP MLD receives an association request frame and/or a reassociation request frame transmitted by the fifth Non-AP STA through the third AP affiliated with the AP MLD, and if a third condition is satisfied, the AP MLD shall reject the association request with a status code of DENIED_ STA_AFFILIATED_WITH_MLD_WITH_EXISTING_MLD_ASSOCIATION, or reject the association request with a status code of REFUSED_TEMPORARILY and initiate the SA query procedure. The third condition is that the MAC address of the fifth Non-AP STA is the same as the MAC address of the sixth Non-AP STA. The sixth Non-AP STA is one of multiple Non-AP STAs affiliated with any third Non-AP MLD which is associated with the AP MLD, and the sixth Non-AP STA operates on the same frequency band and the same channel (i.e., the frequency band and channel on which the third AP operates) as the fifth Non-AP STA.

When the AP MLD receives, through the first AP affiliated with the AP MLD, an association request frame and/or a reassociation request frame containing a basic multi-link element transmitted by the first Non-AP MLD through the Non-AP STA affiliated with the first Non-AP MLD, and if the basic multi-link element satisfies a second condition, the AP MLD shall reject the association request with a status code of DENIED_STA_AFFILIATED_WITH_MLD_WITH_EXISTING_MLD_ASSOCIATION, or reject the association request with a status code of REFUSED_TEMPORARILY and initiate the SA query procedure. The second condition is that the MAC address of at least one affiliated Non-AP STA (denoted as the second Non-AP STA) included in the basic multi-link element is the same as the MAC address of the fourth Non-AP STA. The fourth Non-AP STA is any one of the Non-AP STAs which are associated with the second AP affiliated with the AP MLD, and the fourth Non-AP STA and the second Non-AP STA operate on the same frequency band and the same channel (i.e., the frequency band and the channel on which the second AP operates).

When the AP MLD receives, through the first AP affiliated with the AP MLD, an association request frame and/or a reassociation request frame containing a basic multi-link element transmitted by the first Non-AP MLD through the Non-AP STA affiliated with the first Non-AP MLD, and if the basic multi-link element satisfies a first condition, the AP MLD shall reject the association request with a status code of DENIED_STA_AFFILIATED_WITH_MLD_WITH_EXISTING_MLD_ASSOCIATION. The first condition is that the MAC address of at least one affiliated Non-AP STA (denoted as the second Non-AP STA) included in the base multi-link element is the same as the MAC address of the third Non-AP STA. The third Non-AP STA is one of multiple Non-AP STAs affiliated with any second Non-AP MLD which is associated with the AP MLD, and the second Non-AP STA and the third Non-AP STA operate on the same frequency band and the same channel (which may be the same as or different from the frequency band and the channel on which the first AP operates).

The link control method provided by the embodiments of the disclosure improves the link addition procedure for the multi-link by introducing the following new condition for rejecting the link addition.

When the AP MLD receives, through the first AP affiliated with the AP MLD, an association request frame and/or a reassociation request frame, and/or a multi-link reconfiguration request frame containing a reconfiguration multi-link element transmitted by the first Non-AP MLD through the Non-AP STA affiliated with the first Non-AP MLD, and if the reconfiguration multi-link element satisfies a fourth condition, the AP MLD shall reject the multi-link reconfiguration request and/or reject the association request. The fourth condition is that the MAC address of at least one affiliated Non-AP STA (denoted as the second Non-AP STA) included in the reconfiguration multi-link element is the same as the MAC address of a seventh Non-AP STA. The seventh Non-AP STA is one of multiple Non-AP STAs affiliated with any second Non-AP MLD which is associated with the AP MLD. Alternatively, the seventh Non-AP STA is one of multiple Non-AP STAs which are associated with the second AP affiliated with the AP MLD. The seventh Non-AP STA and the second Non-AP STA operate on the same frequency band and the same channel (which may be the same as or different from the frequency band and the channel on which the first AP operates).

Preferred embodiments of the present disclosure have been described in detail with reference to the accompanying drawings, but the present disclosure is not limited to the specific details of the above embodiments. Within the scope of the technical conception of the present disclosure, various simple modifications can be made to the technical solutions of the present disclosure, and these simple modifications all fall within the scope of protection of the present disclosure. For example, various specific technical features described in the above specific embodiments may be combined in any suitable manner without conflict. Various possible combinations are not further described in the present disclosure to avoid unnecessary repetition. For another example, various different implementations of the present disclosure can also be combined arbitrarily, which should also be considered as the content disclosed by the present disclosure as long as they do not violate the conception of the present disclosure. For another example, various embodiments described in the present disclosure and/or the technical features in various embodiments can be arbitrarily combined with the related technologies without conflict, and the technical solutions obtained after the combination should also fall within the scope of protection of the present disclosure.

It should also be understood that in the various method embodiments of the present disclosure, the size of the serial numbers of the above-mentioned various processes do not indicate a sequence of execution. The sequence of execution of the processes should be determined by their functions and inherent logics, and should not constitute a limitation on the implementation process of the embodiments of the present disclosure. Further, in embodiments of the present disclosure, the terms "downlink", "uplink" and "sidelink" are used to indicate transmission directions of signals or data. The term "downlink" is used to denote that the transmission direction of the signals or the data is a first direction from a station to user equipment in a cell. The term "uplink" is used to denote that the transmission direction of the signals or the data is a second direction from the user equipment in the cell to the station. The term "sidelink" is used to denote that the transmission direction of the signals or the data is a third direction from first user equipment to second user equipment. For example, "downlink signal" means that the transmission direction of the signal is the first direction. In addition, in the embodiments of the present disclosure, the term "and/or" refers to only an association relationship for describing associated objects and represents that three relationships may exist. Specifically, A and/or B may represent three cases: i.e., only A exists, both A and B exist, and only B exists. Furthermore, character "/" in the disclosure usually represents that previous and next associated objects form an "or" relationship.

Figure 19:
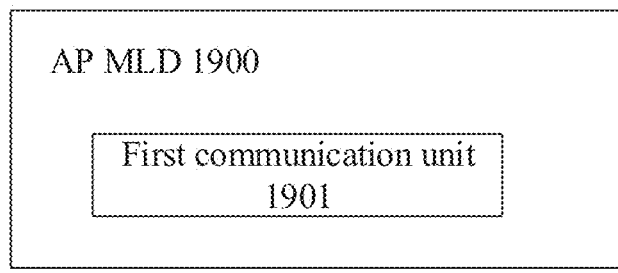
FIG. 19 is an optional structural diagram of an AP MLD according to an embodiment of the disclosure.

FIG. 19 is a schematic structural diagram of an AP MLD provided in an embodiment of the disclosure. As illustrated in FIG. 19, the AP MLD 1900 includes a first communication unit 1901.

The first communication unit 1901 is configured to transmit a first status code when the AP MLD receives a first frame transmitted by a first Non-AP STA affiliated with a first Non-AP MLD through a first AP affiliated with the AP MLD and a first address of at least one second Non-AP STA among Non-AP STAs affiliated with the first Non-AP MLD satisfies a first condition and/or a second condition. The first frame is used for requesting an association and/or a reassociation and/or a multi-link reconfiguration. The first condition is related to at least one third Non-AP STA among Non-AP STAs affiliated with a second Non-AP MLD which is associated with the AP MLD. The second condition is related to fourth Non-AP STA(s) which are associated with a second AP affiliated with the AP MLD. The first status code is used for rejecting an association request and/or a reassociation request and/or a multi-link reconfiguration request.

It is understood that the AP MLD further includes a storage unit, configured to store Non-AP STAs affiliated with the Non-AP MLD which is associated with the AP MLD and/or Non-AP STAs to which are associated with the AP affiliated with the AP MLD.

In some embodiments, the at least one second Non-AP STA is the same as or different from the first Non-AP STA.

In some embodiments, the first condition includes: the first address of the at least one second Non-AP STA is the same as a second address of the at least one third Non-AP STA among the Non-AP STAs affiliated with the second Non-AP MLD.

In some embodiments, the first condition further includes: the at least one second Non-AP STA operates on the same channel as the at least one third Non-AP STA.

In some embodiments, a channel on which the first AP operates is the same as or different from the channel on which the at least one second Non-AP STA operates.

In some embodiments, the second condition includes: the first address of the at least one second Non-AP STA is the same as a third address of at least one fourth Non-AP STA among Non-AP STAs which are associated with the second AP.

In some embodiments, the second condition further includes: the at least one second Non-AP STA operates on the same channel as the at least one fourth Non-AP STA.

In some embodiments, a channel for the second AP is the same as the channel on which the at least one second Non-AP STA operates.

In some embodiments, the second AP is the same as or different from the first AP.

In some embodiments, the first frame includes at least one of: an association request frame; a reassociation request frame; or a multi-link reconfiguration request frame.

In some embodiments, the first frame is used for requesting the association and/or the reassociation with the AP MLD when the first frame includes a basic multi-link element.

In some embodiments, the base multi-link element includes the first address of the at least one second Non-AP STA affiliated with the first Non-AP MLD.

In some embodiments, the first frame is used for requesting the multi-link reconfiguration when the first frame includes a reconfiguration multi-link element.

In some embodiments, the reconfiguration multi-link element includes the first address of the at least one second Non-AP STA affiliated with the first Non-AP MLD.

In some embodiments, the first status code is used for rejecting the association request and/or the reassociation request from the first Non-AP MLD when the first frame is used for requesting the association and/or the reassociation with the AP MLD.

In some embodiments, the first status code is used for temporarily rejecting the association request and/or the reassociation request from the first Non-AP MLD when the first frame is used for requesting the association and/or the reassociation with the AP MLD.

In some embodiments, the AP MLD further includes a control unit, configured to initiate a security association query procedure for the second Non-AP MLD and/or for the fourth Non-AP STA.

In some embodiments, the first status code is used for indicating rejection of the multi-link reconfiguration request when the first frame is used for requesting the multi-link reconfiguration.

In some embodiments, the first status code is used for rejecting to reconfigure colliding link(s) in the first frame when the first frame is used for requesting the multi-link reconfiguration.

In some embodiments, the AP MLD further includes a second communication unit, configured to transmit a second status code when the AP MLD receives a second frame transmitted by a fifth Non-AP STA through a third AP affiliated with the AP MLD and a fourth address of the fifth Non-AP STA satisfies a third condition. The second frame is used for requesting an association and/or a reassociation. The third condition is related to at least one sixth Non-AP STA affiliated with a third Non-AP MLD which is associated with the AP MLD. The second status code is used for rejecting an association request and/or a reassociation request from the fifth Non-AP STA.

It is understood that for the AP MLD, the first communication unit and the second communication unit may be the same communication unit.

In some embodiments, the third condition includes: the fourth address of the fifth Non-AP STA is the same as a fifth address of the at least one sixth Non-AP STA among Non-AP STAs affiliated with the third Non-AP MLD.

In some embodiments, the third condition further includes: the fifth Non-AP STA operates on the same channel as the at least one sixth Non-AP STA.

In some embodiments, the third AP operates on the same channel as the at least one sixth Non-AP STA operates.

In some embodiments, the second frame includes at least one of: an association request frame or a reassociation request frame.

In some embodiments, the second status code is used for rejecting the association request and/or the reassociation request from the fifth Non-AP STA.

In some embodiments, the second status code is used for temporarily rejecting the association request and/or the reassociation request from the fifth Non-AP STA.

In some embodiments, the AP MLD further includes a second control unit, configured to initiate a security association query procedure for the third Non-AP MLD.

Those skilled in the art would appreciate that the relevant description of the above AP MLD according to the embodiments of the present disclosure may be understood with reference to the relevant description of the link control methods according to the embodiments of the present disclosure.

Figure 20:
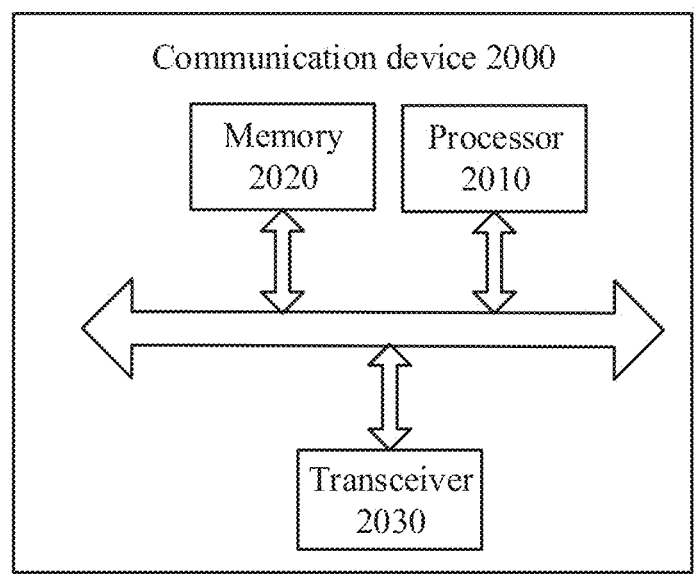
FIG. 20 is a structural diagram of a communication device provided in an embodiment of the disclosure.

FIG. 20 is a schematic structural diagram of a communication device 2000 provided in an embodiment of the disclosure. The communication device may be an AP MLD or a Non-AP device. The communication device 2000 illustrated in FIG. 20 may include a processor 2010 configured to invoke and run a computer program from a memory to implement the methods in the embodiments of the disclosure.

Optionally, as illustrated in FIG. 20, the communication device 2000 may further include a memory 2020. The processor 2010 may invoke and run a computer program from the memory 2020 to implement the methods in the embodiments of the disclosure.

Herein, the memory 2020 may be a separate device independent of the processor 2010 or may be integrated in the processor 2010.

Optionally, as illustrated in FIG. 20, the communication device 2000 may further include a transceiver 2030, and the processor 2010 may control the transceiver 2030 to communicate with other devices. Specifically, the processor 2010 may control the transceiver 2030 to transmit information or data to other devices, or receive information or data from other devices.

Herein, the transceiver 2030 may include a transmitter and a receiver. The transceiver 2030 may further include antennas, and the number of the antennas is one or more.

The communication device 2000 may specifically be the AP MLD in the embodiments of the present disclosure, and the communication device 2000 may implement corresponding processes implemented by the AP MLD in various methods of the embodiments of the present disclosure, which are not elaborated here for the sake of brevity.

Figure 21:
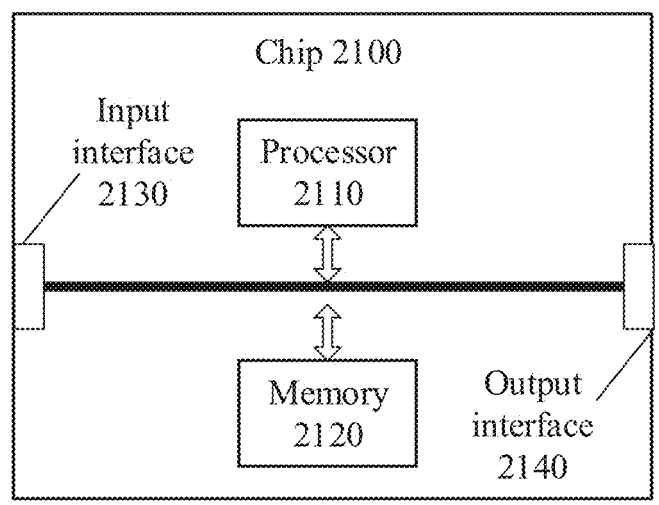
FIG. 21 is a structural diagram of a chip according to an embodiment of the disclosure.

FIG. 21 is a schematic structural diagram of a chip according to an embodiment of the disclosure. The chip 2100 illustrated in FIG. 21 includes a processor 2110 configured to invoke and run a computer program from a memory to implement the methods in the embodiments of the present disclosure.

Optionally, as illustrated in FIG. 21, the chip 2100 may further include a memory 2120, and the processor 2110 may invoke and run a computer program from the memory 2120 to implement the methods in the embodiments of the present disclosure.

Herein, the memory 2120 may be a separate device independent of the processor 2110, or may be integrated in the processor 2110.

Optionally, the chip 2100 may further include an input interface 2130. The processor 2110 may control the input interface 2130 to communicate with other devices or chips. Specifically, the processor 2110 may control the input interface 2130 to acquire information or data transmitted by other devices or chips.

Optionally, the chip 2100 may further include an output interface 2140. The processor 2110 may control the output interface 2140 to communicate with other devices or chips. Specifically, the processor 2110 may control the output interface 2140 to output information or data to other devices or chips.

The chip may be applied to the AP MLD in the embodiments of the present disclosure, and the chip may implement corresponding processes implemented by the AP MLD in various methods of the embodiments of the present disclosure, which are not elaborated here for the sake of brevity.

It should be understood that the chip mentioned in the embodiments of the present disclosure may also be referred to as a system-level chip, a system chip, a chip system, or a system-on-chip chip, or the like.

Figure 22:
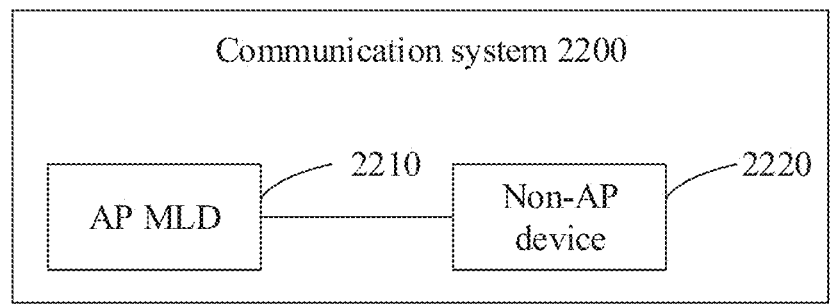
FIG. 22 is a block diagram of a communication system provided in an embodiment of the disclosure.

FIG. 22 is a schematic block diagram of a communication system provided in an embodiment of the disclosure. As illustrated in FIG. 22, the communication system 2200 includes an AP MLD 2210 and a Non-AP device 2220. The Non-AP device may be a STA (e.g., a Non-AP MLD or a Non-AP STA) accessing the AP MLD 2210.

Here, the AP MLD 2210 may be used to implement corresponding processes implemented by the AP MLD in above-mentioned methods, which are not elaborated here for the sake of brevity.

It should be understood that the processor in the embodiments of the disclosure may be an integrated circuit chip having signal processing capability. In implementation, the various operations of the above method embodiments may be accomplished by integrated logic circuit of hardware or instructions in the form of software in a processor. The processor above may include: a general purpose processor, a Digital Signal Processor (DSP), an Application Specific Integrated Circuit (ASIC), a Field Programmable Gate Array (FPGA) or other programmable logic devices, discrete gate or transistor logic devices, discrete hardware components. The methods, operations and logic block diagrams disclosed in embodiments of the present disclosure may be implemented or performed. The general purpose processor may be a microprocessor or the processor may be any conventional processor or the like. The operations of the methods disclosed in combination with the embodiments of the present disclosure can be directly embodied as execution of a hardware decoding processor or combined execution of hardware and software modules in the decoding processor. The software module may be located in a Random-Access Memory (RAM), a flash memory, a Read-Only Memory (ROM), a Programmable ROM (PROM) or an Electrically Erasable EPROM (EEPROM), a register and other storage medium mature in the art. The storage medium is located in the memory, and the processor reads information in the memory and completes the operations of the above methods in combination with its hardware.

It is understood that the memory in embodiments of the present disclosure may be volatile memory or non-volatile memory or may include both volatile and non-volatile memory. The non-volatile memory may be an ROM, a PROM, an Erasable PROM (EPROM), an EEPROM, or a flash memory. The volatile memory may be an RAM which serves as an external cache. By way of illustration but not limitation, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memory of the systems and methods described herein is intended to include but not be limited to these and any other suitable types of memories.

It should be understood that the memory described above is exemplary but not limiting. For example, the memory in embodiments of the present disclosure may also be a SRAM, a DRAM, a SDRAM, a DDR SDRAM, an ESDRAM, an SLDRAM, a DR RAM, or the like. That is, the memory in embodiments of the present disclosure is intended to include but not be limited to these and any other suitable types of memories.

An embodiment of the disclosure also provides a computer-readable storage medium for storing a computer program.

Optionally, the computer-readable storage medium may be applied to the AP MLD in the embodiments of the disclosure, and the execution of the computer program causes the computer to execute corresponding processes implemented by the AP MLD in various methods of the embodiments of the present disclosure, which are not elaborated here for the sake of brevity.

An embodiment of the disclosure also provides a computer program product including computer program instructions.

Optionally, the computer program product may be applied to the AP MLD in the embodiments of the disclosure, and the execution of the computer program instructions causes the computer to execute corresponding processes implemented by the AP MLD in various methods of the embodiments of the present disclosure, which are not elaborated here for the sake of brevity.

An embodiment of the disclosure also provides a computer program.

Optionally, the computer program may be applied to the AP MLD in the embodiments of the disclosure, and the computer program causes a computer to execute corresponding processes implemented by the AP MLD in various methods of the embodiments of the present disclosure when the computer program is run on the computer, which are not elaborated here for the sake of brevity.

Those of ordinary skill in the art would appreciate that the various exemplary units and algorithm operations described in connection with the embodiments in the present disclosure can be implemented in electronic hardware or a combination of computer software and electronic hardware. Whether these functions are performed in hardware or software depends on the specific application and design constraints of the technical solutions. Those of ordinary skill may use different methods for each particular application to implement the described functionality, but such implementation should not be considered outside the scope of the present disclosure.

Those skilled in the art would clearly appreciate that for the specific operating processes of the above-described systems, devices and units, the references may be made to the corresponding processes in the aforementioned method embodiments and would not be repeated herein, for convenience and brevity of description.

In several embodiments provided in the present disclosure, it should be understood that the disclosed systems, devices and methods may be implemented in other ways. For example, the above-described embodiments of the devices are only schematic. For example, the division of the unit is only a logical function division, and in practice, there may be another division method, for example, multiple units or components may be combined or integrated into another system, or some features may be ignored or not performed. Furthermore, the coupling or direct coupling or communication connection between each other illustrated or discussed may be indirect coupling or communication connection through some interfaces, devices or units, and may be electrical, mechanical or other forms.

The units illustrated as separate components may or may not be physically separated, and the components displayed as unit may or may not be physical units, that is, the units and the components may be located in one place, or may be distributed over multiple network units. Part or all of the units can be selected according to the actual needs to achieve the purpose of the embodiments.

In addition, various functional units in the embodiments of the present disclosure may be integrated in one processing unit, or various units may exist physically alone, or two or more units may be integrated in one unit.

The functions may be stored in a computer readable storage medium if implemented in the form of software functional units and sold or used as stand-alone products. In view of this understanding, the technical solutions of the present disclosure in essence, or the part that contributes to the related art, or the part of the technical solutions can be embodied in the form of a software product. The computer software product is stored in a storage medium and includes instructions that enable a computer device (which may be a personal computer, server, network device, or the like) to perform all or part of the operations of the methods described in various embodiments of the present disclosure. The aforementioned storage medium includes a USB flash disk, a removable hard disk, a ROM, a RAM, a magnetic disk or an optical disk and other medium capable of storing program codes.

The above-mentioned is only the specific implementation of the present disclosure, but the scope of protection of the present disclosure is not limited thereto. Any variation or substitution readily conceivable by those skilled in the art within the scope of the technology disclosed in the present disclosure shall be covered by the scope of protection of the present disclosure. Therefore, the scope of protection of the present disclosure should be subject to the scope of protection of the claims.

The invention claimed is:

1. A link control method, comprising:
transmitting, by an Access Point Multi-Link Device (AP MLD), a first status code when the AP MLD receives a multi-link reconfiguration request frame transmitted by a first Non-Access Point Station (Non-AP STA) affiliated with a first Non-Access Point Multi-Link Device (Non-AP MLD) through a first Access Point (AP) affiliated with the AP MLD, and a first address of at least one second Non-AP STA among Non-AP STAs affiliated with the first Non-AP MLD satisfies a first condition and/or a second condition, wherein
the multi-link reconfiguration request frame is used for requesting a multi-link reconfiguration, the first condition is related to at least one third Non-AP STA among Non-AP STAs affiliated with a second Non-AP MLD which is associated with the AP MLD, and the second condition is related to fourth Non-AP STA(s) which are associated with a second AP affiliated with the AP MLD.

2. The method of claim 1, wherein the first condition comprises: the first address of the at least one second Non-AP STA is the same as a second address of the at least one third Non-AP STA among the Non-AP STAs affiliated with the second Non-AP MLD.

3. The method of claim 2, wherein the first condition further comprises: the at least one second Non-AP STA operates on the same channel as the at least one third Non-AP STA.

4. The method of claim 3, wherein a channel on which the first AP operates is the same as or different from the channel on which the at least one second Non-AP STA operates.

5. The method of claim 1, wherein the second condition comprises: the first address of the at least one second Non-AP STA is the same as a third address of at least one fourth Non-AP STA among Non-AP STAs which are associated with the second AP.

6. The method of claim 5, wherein the second condition further comprises: the at least one second Non-AP STA operates on the same channel as the at least one fourth Non-AP STA.

7. The method of claim 6, wherein a channel for the second AP is the same as the channel on which the at least one second Non-AP STA operates.

8. The method of claim 1, wherein the multi-link reconfiguration request frame is used for requesting the multi-link reconfiguration when the multi-link reconfiguration request frame comprises a reconfiguration multi-link element,
wherein the reconfiguration multi-link element comprises the first address of the at least one second Non-AP STA affiliated with the first Non-AP MLD.

9. The method of claim 8, wherein the at least one second Non-AP STA affiliated with the first Non-AP MLD requests to add a link in a case where the first Non-AP MLD establishes a multi-link with the AP MLD.

10. The method of claim 1, wherein the first status code is used for indicating rejection of a multi-link reconfiguration request when the multi-link reconfiguration request frame is used for requesting the multi-link reconfiguration; and/or
the first status code is used for rejecting reconfiguration of conflicting link(s) in the multi-link reconfiguration request frame when the multi-link reconfiguration request frame is used for requesting the multi-link reconfiguration.

11. An Access Point Multi-Link Device (AP MLD), comprising:
a transceiver;
a processor; and
a memory for storing a computer program that, when executed by the processor, causes the AP MLD to:
transmit a first status code through the transceiver when the AP MLD receives a multi-link reconfiguration request frame transmitted by a first Non-Access Point Station (Non-AP STA) affiliated with a first Non-Access Point Multi-Link Device (Non-AP MLD) through a first Access Point (AP) affiliated with the AP MLD, and a first address of at least one second Non-AP STA among Non-AP STAs affiliated with the first Non-AP MLD satisfies a first condition and/or a second condition, wherein
the multi-link reconfiguration request frame is used for requesting a multi-link reconfiguration, the first condition is related to at least one third Non-AP STA among Non-AP STAs affiliated with a second Non-AP MLD which is associated with the AP MLD, and the second condition is related to fourth Non-AP STA(s) which are associated with a second AP affiliated with the AP MLD.

12. The AP MLD of claim 11, wherein the first condition comprises: the first address of the at least one second Non-AP STA is the same as a second address of the at least one third Non-AP STA among the Non-AP STAs affiliated with the second Non-AP MLD.

13. The AP MLD of claim 12, wherein the first condition further comprises: the at least one second Non-AP STA operates on the same channel as the at least one third Non-AP STA.

14. The AP MLD of claim 13, wherein a channel on which the first AP operates is the same as or different from the channel on which the at least one second Non-AP STA operates.

15. The AP MLD of claim 11, wherein the second condition comprises: the first address of the at least one second Non-AP STA is the same as a third address of at least one fourth Non-AP STA among Non-AP STAs which are associated with the second AP.

16. The AP MLD of claim 15, wherein the second condition further comprises: the at least one second Non-AP STA operates on the same channel as the at least one fourth Non-AP STA.

17. The AP MLD of claim 16, wherein a channel for the second AP is the same as the channel on which the at least one second Non-AP STA operates.

18. The AP MLD of claim 11, wherein the multi-link reconfiguration request frame is used for requesting the multi-link reconfiguration when the multi-link reconfiguration request frame comprises a reconfiguration multi-link element,
   wherein the reconfiguration multi-link element comprises the first address of the at least one second Non-AP STA affiliated with the first Non-AP MLD.

19. The AP MLD of claim 18, wherein the at least one second Non-AP STA affiliated with the first Non-AP MLD requests to add a link in a case where the first Non-AP MLD establishes a multi-link with the AP MLD.

20. The AP MLD of claim 11, wherein the first status code is used for indicating rejection of a multi-link reconfiguration request when the multi-link reconfiguration request frame is used for requesting the multi-link reconfiguration; and/or
   the first status code is used for rejecting reconfiguration of colliding link(s) in the first frame when the multi-link reconfiguration request frame is used for requesting the multi-link reconfiguration.

* * * * *